United States Patent
Amundsen et al.

(10) Patent No.: US 6,442,539 B1
(45) Date of Patent: Aug. 27, 2002

(54) GENERATING STATISTICS FOR DATABASE QUERIES USING TENSOR REPRESENTATIONS

(75) Inventors: Lance Christopher Amundsen; Kevin James Kathmann; John Matthew Santosuosso, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/441,737

(22) Filed: Nov. 17, 1999

(51) Int. Cl.[7] .......................... G06F 17/30; G06F 17/00
(52) U.S. Cl. .................................. 707/2; 707/3
(58) Field of Search ........................ 707/2–4, 10, 200; 709/217

(56) References Cited

U.S. PATENT DOCUMENTS

| | | | | |
|---|---|---|---|---|
| 5,495,608 A | * | 2/1996 | Antohenkov | 395/600 |
| 5,560,007 A | * | 9/1996 | Thai | 395/600 |
| 5,666,528 A | * | 9/1997 | Thai | 395/613 |
| 6,122,636 A | * | 9/2000 | Malloy | 707/102 |

OTHER PUBLICATIONS

Ashany,"Application of Sparse Matrix Techniques To Secure Search, Retrieval, Classification and Relationship Analysis in Large Database Systems—SPARCOM", Sep. 1978, Fourth Internal Conference On Very Large Data Bases, p.499–516.*

* cited by examiner

*Primary Examiner*—John Breene
*Assistant Examiner*—Susan Rayyan
(74) *Attorney, Agent, or Firm*—Wood, Herron & Evans, LLP

(57) ABSTRACT

Query results and statistics regarding them are generated using a novel representation of an n-attribute relation as an order n relational tensor. Orders of the relational tensor respectively correspond to each of the attributes, and each coordinate along an order relates to a key value of the corresponding attribute. Numeric values are stored in the relational tensor, each numeric value representing a count of tuples having the attribute key values that correspond to the coordinate of the numeric value along the orders of the relational tensor. This storage representation is useful in a variety of contexts for enhancing the performance of a RDBMS system. Specifically, in a first aspect of the invention, a tensor representation can be used to generate statistics for a user query so that the relational database system can determine, from among two candidate approaches, an approach to use in processing the user query based on the statistic. Also, a a data-representing relational tensor can be used to produce results for a restrict operation such as the SQL operations DISTINCT, PROJECTION, EQUALS, LESS THAN, LESS THAN OR EQUAL, GREATER THAN, GREATER THAN OR EQUAL and LIKE.

57 Claims, 11 Drawing Sheets

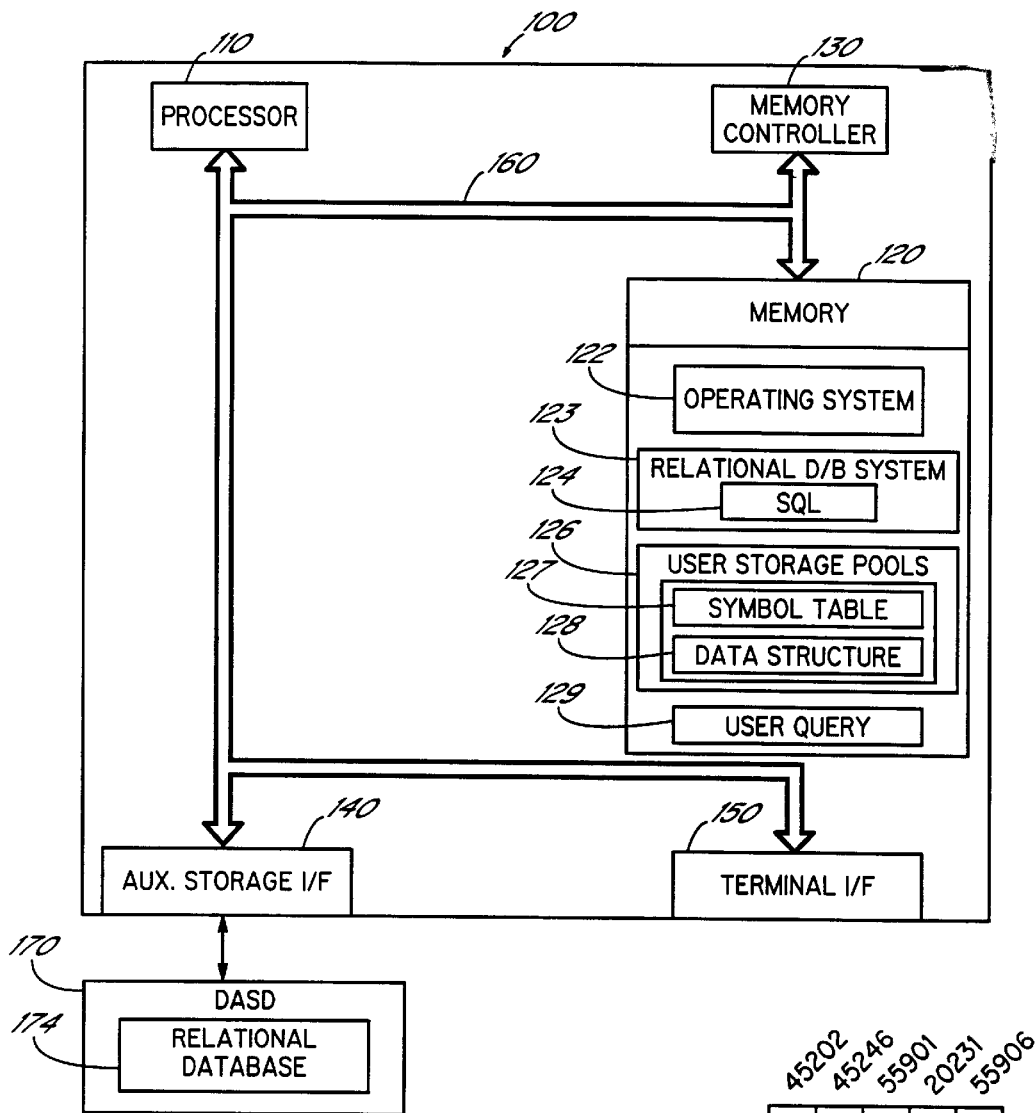

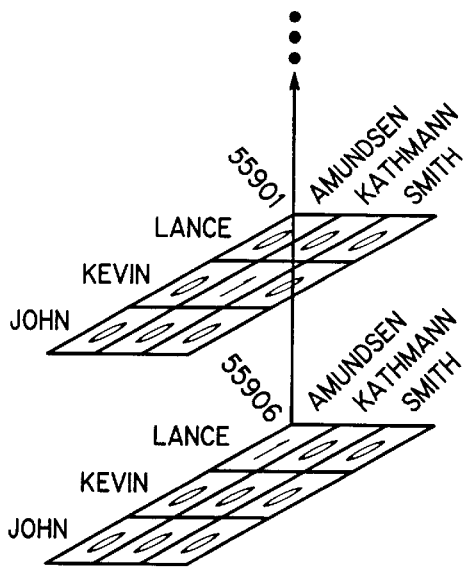

FIG. 2D $T_1 =$

|  | 45202 | 45246 | 55901 | 20231 | 55906 |
|---|---|---|---|---|---|
| CINCINNATI, OH | 1 | 0 | 0 | 0 | 0 |
| GLENDALE, OH | 0 | 1 | 0 | 0 | 0 |
| ROCHESTER, MN | 0 | 0 | 1 | 0 | 1 |
| WASHINGTON, DC | 0 | 0 | 0 | 1 | 0 |

FIG. 3A $T_2 =$

|  | 45202 | 45246 | 55901 | 20231 | 55906 |
|---|---|---|---|---|---|
| CINCINNATI, OH | 1 | 1 | 1 | 1 | 1 |
| GLENDALE, OH | 1 | 1 | 1 | 1 | 1 |
| ROCHESTER, MN | 0 | 0 | 0 | 0 | 0 |
| WASHINGTON, DC | 0 | 0 | 0 | 0 | 0 |

FIG. 3B $T_1 \odot T_2 =$

|  | 45202 | 45246 | 55901 | 20231 | 55906 |
|---|---|---|---|---|---|
| CINCINNATI, OH | 1 | 0 | 0 | 0 | 0 |
| GLENDALE, OH | 0 | 1 | 0 | 0 | 0 |
| ROCHESTER, MN | 0 | 0 | 0 | 0 | 0 |
| WASHINGTON, DC | 0 | 0 | 0 | 0 | 0 |

$T_1 \odot T_2 =$

| CITY | POSTAL CODE |
|---|---|
| CINCINNATI, OH | 45202 |
| GLENDALE, OH | 45246 |

FIG. 3C $T_2 =$

|  | 45202 | 45246 |
|---|---|---|
| CINCINNATI, OH | 1 | 1 |
| GLENDALE, OH | 1 | 1 |
| CLEVELAND, OH | 1 | 1 |
| COLUMBUS, OH | 1 | 1 |

FIG. 3D $T_1 \odot T_2 =$

|  | 45202 | 45246 | 55901 | 20231 | 55906 |
|---|---|---|---|---|---|
| CINCINNATI, OH | 1 | 0 | 0 | 0 | 0 |
| GLENDALE, OH | 0 | 1 | 0 | 0 | 0 |
| CLEVELAND, OH | 0 | 0 | 0 | 0 | 0 |
| COLUMBUS, OH | 0 | 0 | 0 | 0 | 0 |
| ROCHESTER, MN | 0 | 0 | 0 | 0 | 0 |
| WASHINGTON, DC | 0 | 0 | 0 | 0 | 0 |

FIG. 3E

GENERATING STATISTICS FOR DATABASE QUERIES USING TENSOR REPRESENTATIONS

CROSS-REFERENCE TO RELATED APPLICATIONS

This application is related to U.S. patent application Ser. No. 09/441,818 entitled GENERATING RESTRICTION QUERIES USING TENSOR REPRESENTATIONS, filed concurrently herewith by Lance Amundsen et al., which is incorporated by reference herein in its entirety.

FIELD OF THE INVENTION

The present invention relates to generation of statistics in the management and execution of relational database queries.

BACKGROUND OF THE INVENTION

Relational Database Management System (RDBMS) software using a Structured Query Language (SQL) interface is well known in the art. The SQL interface has evolved into a standard language for RDBMS software and has been adopted as such by both the American Nationals Standard Organization (ANSI) and the International Standards Organization (ISO).

In RDBMS software, all data is externally structured into relations, each relation dealing with one or more attributes and comprising one or more tuples of data, each tuple associating attribute values with each other. A relation can be visualized as a table, having rows and columns (indeed, the relations in a particular database are often referred to as the "tables" of the database). When a relation is visualized as a table, the columns of the table represent attributes of the relation, and the rows of the table represent individual tuples or records that are stored using those attributes. To aid in visualizing relations in this manner, In the following, the relations in an RDBMS system will frequently be referred to as that system's "tables".

An RDBMS system may be used to store and manipulate a wide variety of data. For example, consider a simple RDBMS system for storing and manipulating name and address information. In such a system, a "Name/Address" table storing name and address attributes might have a first column "Last Name" for the last name, a second column "First Name" for the first name, a third column "M.I." for middle initial, and further columns for addresses. Each row in the table would include the name and address data for a particular individual.

Often, columns in different tables are related. Thus, in the above example, the "Name/Address" table might have a column for a street address, and a column for a ZIP code or other postal code (i.e., a unique identifying index number or character string that identifies a general location of a street address). In this example, each row of the "Name/Address" table identifies a postal code for the individual described by that row, but does not identify a city. A second "City" table might store city names; in two columns, a first column for the city name and a second column for the postal code of the city. Note that there may be multiple persons in each postal code and so the "Name/Address" table is likely to have multiple entries identifying the same postal code. Furthermore, there are likely to be multiple postal codes in the same city, so the "City" table is likely to have multiple rows for the same city.

It should be noted that the order of tuples in a relation is not considered a feature of the relation; that is, two relations having the same tuples, but in a different order, are entirely equivalent to the RDBMS system. Tuple order is determined by user commands, if any, that specify a manner in which to sort the tuples. Absent a specified sort order, the order of the tuples in a relation is not defined, and tuples from the relation may be reported in any order.

An overall database organization is typically referred to as a schema for the database. A database schema is often compactly expressed using table names and names of columns in the table. Thus the simple schema including "Name/Address" and "City" tables described in the above example, could be expressed as:

Name/Address(LastName,FirstName,M.I.,PostalCode,...)

City(City,PostalCode)

Database schema often take the form of a "star", where there is one very large "mother" table and many small detail tables. Queries typically involve selections based on the attributes of the detail tables, e.g. the City table storing city names, followed by retrieval of information for the selected tuples from the mother table, e.g. the Name/Address table storing names and addresses for persons. From the foregoing description, it can be seen that to find the persons in a particular city, the rows in the "City" table would be scanned to find those rows having the desired city name, and then the postal codes in those rows would be retrieved. Then, the "Name/Address" table would be scanned to locate all rows from the table having the postal code in the postal code column. The names and addresses for the selected rows are the individuals residing in the desired city.

A typical way of looking up information in tables uses indexes. For example, there may be an index into the Name/Address table identifying all of the rows that have a particular value for a postal code. This index is stored separately from the table and must be updated each time the table itself is updated. Accordingly, indexes introduce a substantial increase in storage requirements. However, if no index is available, a query into a table can only be satisfied by scanning each row of the table, which requires substantially longer processing time. In an environment such as decision support, where selections may be on an arbitrary number of detail tables, maximum speed requires indices on most or all columns of some tables, making such applications space-intensive. Typically, in other environments, performance is compromised to reduce storage requirements, by not providing a column index for at least some columns of a table.

One type of index is a bitmap index, which indicates whether a specific value exists for each row in a particular column. One bit represents each row. Thus, in the bitmap index for the value "45246" in the column "Postal Code," the nth bit equals 1 if the nth row of the Name/Address table contains a postal code of "45246", or 0 if that row holds a value other than "45246". Typically there are multiple bitmap indexes for each column, one for each of several values that may appear in the column (e.g., one index for the value "45246", a second index for the value "45202", and so on). Another type of index is an encoded vector index (EVI), disclosed U.S. Pat. No. 5,706,495, issued Jan. 6, 1998 to Chadha et al., entitled ENCODED-VECTOR INDICES FOR DECISION SUPPORT AND WAREHOUSING, which is incorporated by reference. An EVI serves a similar purpose as a bitmap index, but only one index is necessary to account for all the values occurring in the column (whether they be "45246," "45202," or any other). In an EVI on the "Postal Code" column, the nth position of the EVI contains a bit code, that can be decoded using a lookup table to produce the value "45246", which is the postal code in the nth row of the table. Thus, whereas a separate bitmap index is required to map each particular key value in a database field, only one EVI is required to represent the same information. Thus, an EVI saves computer memory by including all possible key values for a given field in one database index. Notably, however, both a bitmap index and EVI index indexes only information relating to a single column of the table. These indexes do not reflect the relations between values in multiple columns.

Turning now to a description of SQL, the main RDBMS operation described in the preceding examples is known as a JOIN, in the illustrated case, between the "City" table and "Name/Address" table. This is one example of the many operators that are provided by an SQL interface to RDBMS software. The SQL interface allows users to formulate relational operations on tables either interactively, in batch files, or embedded in host languages such as C, COBOL, etc. Operators are provided in SQL that allow the user to manipulate the data; each operator operates on either one or two tables and produces a new table as a result. The power of SQL lies on its ability to link information from multiple tables or views together to perform complex sets of procedures such as the simple procedure in the above example, with a single statement.

The operators provided by SQL are derived from an original set of eight operators:

RESTRICT Extracts specified tuples from a specified relation (i.e., retrieves specified rows from a table) using a specified condition;

PROJECT Extracts specified attributes from a specified relation (i.e., retrieves specified columns from a table);

PRODUCT Builds a relation from two specified relations containing all possible combinations of tuples, one from each of the two relations (i.e., builds a table with rows created by combining all rows of two tables);

UNION Builds a relation consisting of all tuples appearing in either or both of two relations (i.e., builds a table having all rows appearing in either table);

INTERSECT Builds a relation consisting of all tuples appearing in both of two specified relations (i.e., builds a table having all rows appearing in both tables);

DIFFERENCE Builds a relation (table) consisting of all tuples (rows) appearing in the first and not the second of two specified relations (tables);

JOIN Builds a relation (table) from two specified relations (table) consisting of all possible combinations of tuples (rows), one from each of the two relations (tables), such that the two tuples (rows) contributing to any given combination satisfy a specified condition;

DIVIDE Builds a relation (table) from a first relation (table) having first and second attributes (columns) and a second relation (table) having one attribute (column), by selecting from the first table, values of the first attribute (column) of tuples (rows) whose second attribute (column) matches a value in the second table.

With respect to these basic operations, and the more detailed operations derived from them that form the entirety of SQL, it is notable that the result of each operation is a relation that is equivalent in structure to the relations that are used by the operation. This is an important feature in that it permits SQL operations to be written as nested relational expressions, where the output of one operation is used as the input to the next operation. The power of SQL arises in no small part from the ability to string SQL operations together in any desired order to perform a desired function.

As an example of this ability, we can expand the above example to illustrate a three-way table join. For this, assume a Population table is available, which identifies city populations, e.g., the Population table has a first column for a city name and a second column for the population of the city. Given the Name/Address, City and Population tables, it is possible to identify those persons living in cities with populations greater than a given threshold, by JOINing the Population and City tables with a population threshold criterion, and then JOINing the result with the Name/Address table.

At this point, it should be noted that an RDBMS system implementing an SQL query need not materialize the result of every individual SQL operation in its entirety. For example, the foregoing example seeking every address in the database that is in a particular city, formally involves performing a RESTRICT operation (restricting to the desired city) upon the results of a JOIN operation acting on Name/Address and City tables. It would be inefficient to compute the results of the JOIN operation, which would be a table of every address in the Name/Address table expanded to include city names, and then select only those addresses in the desired city. The more efficient approach, as described in the preceding example, would be to apply the restriction to each tuple of the JOIN operation as it is generated, keeping only those which meet the restriction and discarding the remainder. This way, an equivalent result is produced without materializing the result of the JOIN.

To achieve optimizations of this sort, an RDBMS system often includes substantial logic to avoid materializing intermediate results. For such optimizations, an RDBMS system utilizes statistics describing the data upon which SQL operations operate. Two such statistics pertinent to the described examples are a key range estimate and a join fanout estimate. A key range estimate estimates the number of rows in a given table that match a given condition. A join fanout estimate estimates the number of records likely to be produced by a JOIN operation. In the last described example, such statistics would indicate whether there are a large number of postal codes in the database for cities meeting the population criterion, and whether the Name/Address records are grouped in a few cities or spread across a large number of cities. These statistics would then be useful in determining whether it would be more efficient to (a.) join the Name/Address table with the City table before joining the Population table, by building an intermediate result with the name, address and city for every individual, and then selecting from this intermediate result, those individuals in cities meeting the population criterion, or (b.) join the City and Population tables before joining the Name/Address table, by building an intermediate result with the postal codes in the cities meeting the population criterion, and then selecting those individuals in the Name/Address table having the postal codes in the intermediate result. Typically, the most efficient approach is the approach that produces the smallest intermediate result.

Statistics of this form are frequently generated using available indeces for the tables upon which SQL operations will be performed. For example, a key range estimate can be formed from a bit mapped index by totaling the number of "1" bits in the index under the identified key value(s). Unfortunately, because many columns in modem RDBMS systems are not indexed, key range and join fanout statistics are often unavailable or inaccurate, resulting in substantial inefficiencies because queries are performed in other than the optimal manner due to the missing or inaccurate statistics.

As will be appreciated from the foregoing, modern RDBMS systems suffer from a number of drawbacks that render their operation less than optimal; key among these are the space requirements associated with generating indexes and, due to the consequent lack of complete indexing, the lack of accurate statistics that can be useful in optimizing RDBMS operations. What is needed is a alternative representation of data in a RDBMS system that facilitates the generation of SQL results and statistics regarding such results without consumption of inordinate storage space.

SUMMARY OF THE INVENTION

In accordance with principles of the present invention, these needs are met by a novel representation of an n-attribute relation as an order n relational tensor, thereby facilitating the generation of query results.

Specifically, in accordance with principles of the present invention, a relational database system stores a plurality of tuples formed over a plurality of attributes, in a multi-order relational tensor. Orders of the relational tensor respectively correspond to each of the attributes, and each coordinate along an order relates to a key value of the corresponding attribute. Numeric values are stored in the relational tensor, each numeric value representing a count of tuples having the attribute key values that correspond to the coordinate of the numeric value along the orders of the relational tensor. This storage representation is useful in a variety of contexts for enhancing the performance of a RDBMS system.

Specifically, in a first aspect of the invention, a data-representing relational tensor is processed to generate a statistic for a user query specifying a relational operation on at least one attribute over which the data-representing relational tensor was formed. In this embodiment, a relational database system determines, from among two candidate approaches, an approach to use in processing the user query based on the statistic.

In a second aspect of the present invention, a data-representing relational tensor is used to produce results for a restrict operation such as the SQL operations DISTINCT, PROJECTION, EQUALS, LESS THAN, LESS THAN OR EQUAL, GREATER THAN, GREATER THAN OR EQUAL and LIKE. In accordance with this aspect, a relational database system processes a data-representing relational tensor to produce a result relational tensor identifying the results of the restrict operation.

These and other features and advantages, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWING

FIG. 1 is a block diagram of an apparatus according to an embodiment of the present invention;

FIG. 2A is an illustration of a relation on two attributes, illustrated as a table, and FIG. 2B is a relational tensor representation of the tuples shown in FIG. 2A, and FIG. 2C is an illustration of a relation on three attributes, illustrated as a table, and FIG. 2D is a relational tensor representation of the first two tuples shown in FIG. 2C, further coordinates on the vertical domain needed to represent other tuples being omitted for the purpose of brevity;

FIG. 3A is an illustration of a data-representing relational tensor identical to that shown in FIG. 2B, FIG. 3B is an illustration of a relational selection tensor used in a relational tensor product with the relational tensor of FIG. 3A, and FIG. 3C is an illustration of the result of the relational tensor product of the relational tensors of FIGS. 3A and 3B;

FIG. 3D is an illustration of a second relational selection tensor used in a relational tensor product with the relational tensor of FIG. 3A, and FIG. 3E is an illustration of the result of the relational tensor product of the relational tensors of FIGS. 3D and 3E;

FIG. 6 is a flow chart of a process for relational tensor contraction along a specified order, as is utilized in the process of FIG. 4 for PROJECTION restriction operations;

DETAILED DESCRIPTION

Figure 3:
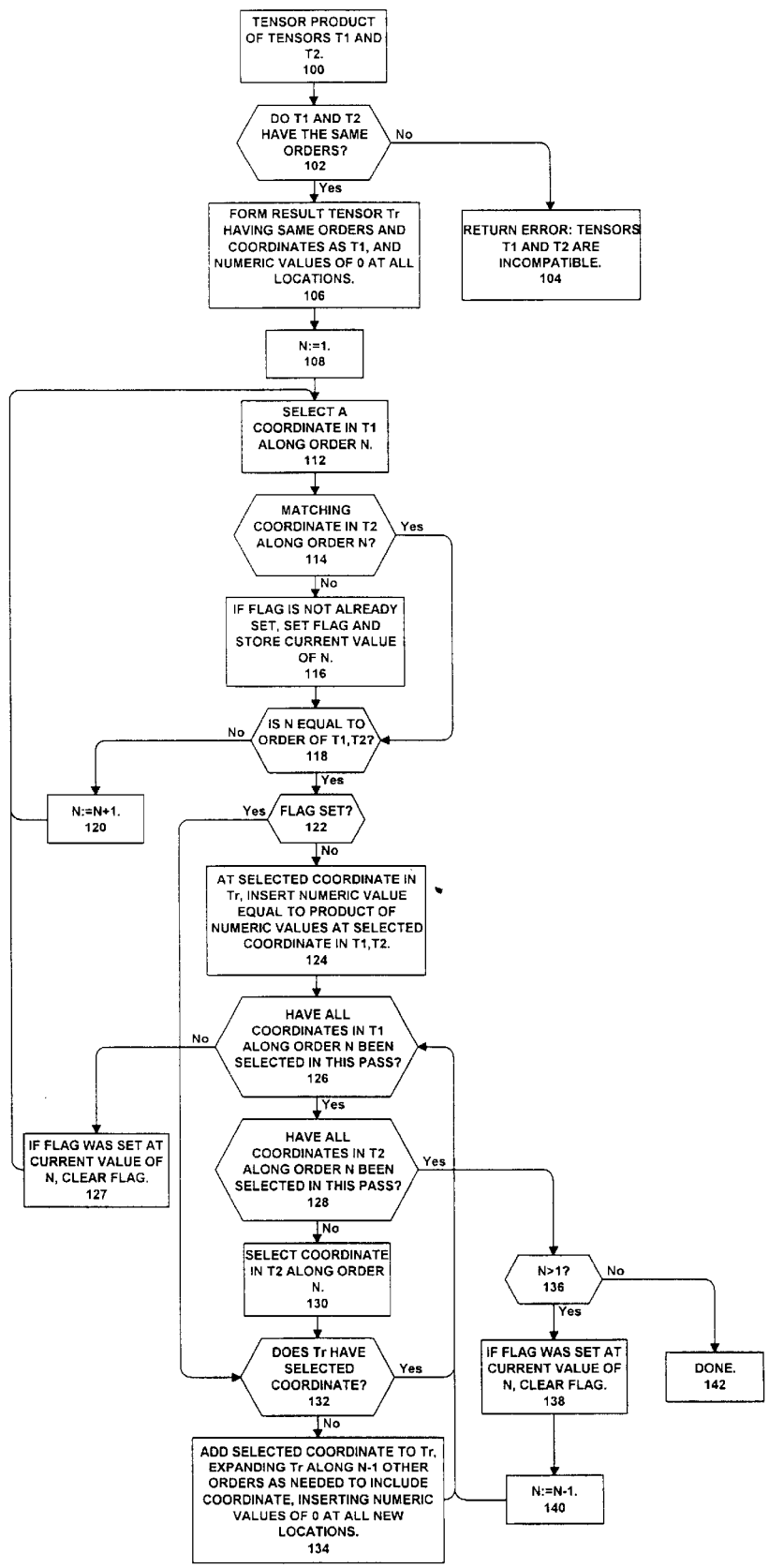
FIG. 3 is a flow chart of a process for forming a relational tensor product of two relational tensors in accordance with principles of the present invention.

The methods of the present invention employ computer-implemented routines to query information from a database. Referring now to FIG. 1, a block diagram of a computer system which can implement an embodiment of the present invention is shown. The computer system shown in FIG. 1 is an IBM AS/400; however, those skilled in the art will appreciate that the method and apparatus of the present invention apply equally to any computer system, regardless of whether the computer system is a complicated multi-user computing apparatus or a single user device such as a personal computer or workstation. Thus, computer system 100 can comprise other types of computers such as IBM compatible personal computers running OS/2 or Microsoft's Windows. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes a computer program within main memory 120.

Auxiliary storage interface 140 allows computer system 100 to store and retrieve information such as relational database information 174 from auxiliary storage devices, such as magnetic disk (e.g., hard disks or floppy diskettes) or optical storage devices (e.g., CD-ROM). As shown in FIG. 1, one suitable storage device is a direct access storage device (DASD) 170. DASD 170 may alternatively be a floppy disk drive which may read programs and data such as relational database table 174 from a floppy disk. In this application, the term "backing storage" will be used to collectively refer to all types of storage devices, including disk drives, optical drives, tape drives, etc.

It is important to note that while the present invention has been (and will continue to be) described in the context of a fully functional computer system, those skilled in the art will appreciate that the mechanisms of the present invention are capable of being distributed as a program product for execution on a computer system, separately from the computer system itself. Such a program product can be distributed in a variety of forms, and the present invention applies equally regardless of the particular type of signal bearing media to actually carry out the distribution.

Examples of signal bearing media include: recordable type media such as floppy disks (e.g., a floppy disk) and CD-ROMS and CD-RW, and transmission type media such as digital and analog communication links, including wireless communication links.

Memory controller 130, through use of a processor, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and/or multiple buses. Similarly, although the system bus 160 of the embodiment is a typical hardwired, multidrop bus, any connection means that supports-directional communication in a computer-related environment could be used.

In the illustrated embodiment, memory 120 suitably includes an operating system 122, a relational database system 123, and user storage pools 126. Relational database system 123 includes structured query language (SQL) interface 124, which is an interactive query and report writing interface. Those skilled in the art will realize that SQL interface 124 could reside independent of relational database system 123, in a separate memory location.

User storage pools 126 include relational tensor storage, and a user query 129.

Relational tensor storage 126 includes one or more symbol tables 127 and one or more associated data structures 128, which are in the form of relational tensors. Relational tensors stored in relational tensor storage 126 may be utilized as an index or alternative representation for a relational database table stored in memory 120 or DASD 170. Alternatively, in accordance with principles of the present invention, a relational tensor form may be the only representation of some or all of the relations in the system.

User query 129 is a request for information from the relational database stored in DASD 170. The methods of the present invention do not necessarily require that the entire relational database be loaded into memory 120 to obtain the information requested in user query 129. Instead, only portions of the relational database, e.g., particular relational tensors, may be loaded into memory 120 and processed to provide relational database system 123 an efficient way to obtain the information requested by user query 129.

It should be understood that for purposes of this application, memory 120 is used in its broadest sense, and can include Dynamic Random Access Memory (DRAM), Static RAM (SRAM), flash memory, cache memory, etc. Additionally, memory 120 can comprise a portion of a disk drive used as a swap file. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

Users of relational database system 123 provide a request for information in a useful form by creating a user query 129. User query 129 is a way to ask relational database system 123 to provide only the set of information from relational database table 174 that meets certain criteria. Structured Query Language (SQL) 124 is the standard command language used to query relational databases. SQL commands are entered by a user to create user query 129, which then typically undergoes the following front-end processing by relational database system 123. User query 129 is parsed for syntax errors. The relational database table from where the user wants his information is identified. The attribute (field) name(s) associated with the information are verified to exist in the relational database. And, the SQL commands in user query 129 are reviewed by optimization software in relational database system 123 to determine the most efficient manner in which to process the user's request.

In an embodiment of the invention in which the database or portions thereof is stored in both a relational tensor and table representation, the front-end optimization processing of user query 129 by relational database system 123 includes determining whether relational tensors 126 exist that may be used to increase the efficiently of responding to the user query 129, by either generating statistics for the user query or generating the query response itself. In order for a relational tensor to be useful to the methods of the present invention, the relational tensor must be built over the attributes and relation specified by the criteria in user query 129. That is, there must be relational tensor for the particular fields in the particular table referenced by the query.

Specific operations that may be performed with relational tensors will be described in detail below. Initially, however, the relational tensor representation for relational data will be described, and certain fundamental operations useful in manipulation of relational tensors will be defined.

Referring now to FIG. 2A, a table representing a two-attribute relation can be examined. The table representation used in FIG. 2A is a conventional representation for relational data, as discussed above. The relation illustrated in FIG. 2A is consistent with the example described above; tuples relate city names to postal codes. Each tuple includes a city/state attribute and a postal code attribute. In the illustrated case, which is simplified for the purposes of illustration, there are five tuples for five different zip codes. It will be noted that two of the zip codes are in Rochester, Minn. and so have the same value for the city/state attribute.

FIG. 2B illustrates a relational tensor representation of the tuples shown in table format in FIG. 2A. As can be seen in FIG. 2B, this relational tensor representation takes the general form of a matrix. However, a relational tensor is not a matrix and operations known and defined for matrices are in most cases not applicable to relational tensors, and vice-versa. Broadly speaking, an order-n relational tensor is an outer product of the domains of n attributes of a relation. We use the term "relational tensor" to describe this construct because the construct is not a tensor in the classic mathematical sense, although it has analogies to a known tensor construction. While the term "relational tensor" has been used thus far, for brevity, in the following discussion the term "tensor" will be used in most places rather than the complete name "relational tensor". It is to be understood that a "tensor" as used in this application is a "relational tensor" and not the known mathematical construct known as a tensor.

Continuing on FIG. 2B, the first attribute of the relation of FIG. 2A, namely the city/state attribute, is associated with a first dimensional order of the tensor, in this case, illustrated as the rows. The second attribute of the relation of FIG. 2A, namely the postal code attribute. is associated with a second dimensional order of the tensor, in this case, illustrated as the columns. It will be appreciated that a tensor representation can also be made of a relation having three or more attributes, in which case each attribute will be associated with a dimensional order of the tensor.

Along each order of the tensor are a plurality of discrete coordinates, each coordinate relates to a key value found in the corresponding attribute of one or more tuples. Thus, along the first order of the tensor of FIG. 2B, the coordinates are "Cincinnati, Ohio", "Glendale, Ohio", "Rochester, Minn." and "Washington, D.C.", which are the unique values of the city/state attribute of the represented relation. Along the second order of the tensor of FIG. 2B, the coordinates are "45202", "45246", "55901", "20231 " and "55906", which are the unique values of the postal code attribute of the represented relation. For future reference, the set of coordinates along an order of a tensor will be know as the "domain" of the tensor along that order.

As will be appreciated from the foregoing, each location within a tensor has a coordinate along each order of the tensor, and collectively these coordinates identify a unique combination of values in each attribute represented by the tensor. To represent the tuples of a relation, at each coordinate location, the tensor stores a numeric value. The numeric value at a given coordinate represents a count of the number of tuples having the attribute values that correspond to the coordinate of the numeric value along the orders of the tensor. Thus, in the tensor of FIG. 2B, there is a numeric value of "1" at the coordinates ("Cincinnati, Ohio", "45202"), indicating that the relation includes a tuple having these attribute values. There is a numeric value of "0" at all other coordinates along the "Postal Code" order corresponding to "Cincinnati, Ohio", indicating that there are no other tuples having a "City/State" attribute of "Cincinnati, Ohio". Similarly, there are numeric values of"1" stored at each coordinate corresponding to other tuples in the relation, i.e. at ("Glendale, Ohio","45246"), ("Rochester, Minn.", "55901"), ("Rochester, Minn.","55906"), and ("Washington, D.C.","20231"). It will be appreciated that, were the original relation to include multiple tuples having the same attribute values for "City/State" and "Postal Code", then numeric values greater than or equal to 2 would be placed at the corresponding coordinate in the tensor of FIG. 2B, to represent that multiple tuples exist with those coordinate values.

Referring now to FIG. 2C, there is shown in tabular form, a relation consistent with the above examples, having three attributes. Specifically, tuples in this relation have attributes for a "first" name and "last" name, and a further attribute for a postal code. Each tuple in the relation identifies an individual's first and last names and that persons postal code.

Referring to FIG. 2D, there is shown a tensor of the relation shown in FIG. 2C. This tensor has three orders, each associated with one of the attributes of the relation. Thus, along a first order, the coordinates are the domain for the "first" name attribute, namely "John", "Kevin" and "Lance". Along a second order, the coordinates are the domain for the "last" name attribute, namely "Amundsen", "Kathmann" and "Smith". Along a third order, the coordinates are the domain for the "postal code" attribute, namely "55906", "55901", etc. This order 3 tensor is illustrated three dimensionally, as a series of planes, each plane corresponding to a value for the "postal code" attribute. Within each plane, the each location corresponds to a value for the "first" name and "last" name attributes. Thus, the coordinates of each three dimensional location corresponds to a unique combination of the "first" name, "last" name and "postal code" attributes. It can be seen that in the plane corresponding to the postal code value "55906", there is a numeric value of "1" at the location corresponding to the tuple ("Lance","Amundson","55906"), indicating that there is a tuple in the relation having this combination of attribute values. All other locations in the in the plane corresponding to the postal code value "55906" having a numeric value of "0", indicating that no other tuples have a postal code value of "55906".

It will be appreciated that a tensor representation can be used for a relation with an arbitrary number of attributes; the tensor representation will have one order for each attribute in the relation. Order 2 and Order 3 tensors have been illustrated in FIGS. 2B and 2D for the reason that tensors of larger order are difficult to illustrate, but higher order tensors can be readily represented in a computer system as arrays. It will also be appreciated that the examples of FIGS. 2A through 2D are trivial in that there is a relatively small number of tuples and a relatively small domain in each of the attributes, for the reason that larger numbers of tuples and larger domains are difficult to illustrate. Relations with larger numbers of tuples and tensors with large attribute domains can, however, be readily represented in a computer system.

It will be appreciated that the tensor representation of a relation as illustrated above, bears some analogies to a matrix such as is used in principles of linear algebra. In the following, various relational operations that can be performed on a tensor representation of a relation will be discussed, and analogies will be drawn to vector and matrix operations that are well known in the field of linear algebra. These operations include the generalized scalar product operation, which in linear algebra involves the atomic operation of accumulating a sum of products of components of vector spaces. Where the operands to a generalized scalar product are two vectors arranged in an appropriate manner, the result is a scalar value that is frequently referred to as the "inner product" or "dot product" of the two vectors. When the operands to a generalized scalar product are two vectors arranged in another manner, or when the operands to a generalized scalar product are a matrix and a vector, or two matrices, the result can be a vector or matrix, based on the arrangement of the operands and their relative orientations.

Relational operations performed using tensors utilize, in some circumstances, operations similar to the generalized scalar product. However, as will be seen from the following, several unique operations must also be defined that have no analogy in linear algebra.

A few comments on the use of relational tensors are in order at this point.

A data-representing relational tensor may be formed for all attributes of the relation upon which the query operates, or may be formed for only a subset of the attributes of the relation. In either case, the. data-representing relational tensor may be effectively used for generating statistics so long as the attributes specified in the relational operation are included in the data-representing relational tensor.

As is elaborated below, where a user's query specifies a restriction operation, a statistic can be generated for the query, indicating the number of tuples meeting the restriction. To generate the statistic, the data-representing relational tensor is processed by accumulating the numeric values stored in the relational tensor having the coordinates meeting the criterion specified in the user query. In the disclosed specific embodiment, this accumulation is accomplished by forming a relational selection tensor representing the criterion of the user query, forming a relational tensor product of the relational selection tensor and data-representing relational tensor, and then contracting the resulting relational tensor to a scalar value.

In this disclosed embodiment, the relational selection tensor is a relational tensor having orders that are compatible with the orders in the data-representing relational tensor, and holding only numeric values of 1 or 0. The relational selection tensor holds a numeric value of 1 in those coordinates corresponding to tuple values meeting the criterion in the user query, and holds a numeric value of 0 in those coordinates corresponding to tuple values not meeting the criterion in the user query.

In the described particular embodiment, the relational selection tensor is built from a plurality of atomic operations that must each be true for the user query criterion to be met, by forming intermediate relational selection tensors representing each such criterion, and forming a relational tensor product of the intermediate relational selection tensors to form the relational selection tensor representing the plurality of criteria of the user query. The intermediate relational selection tensors hold a numeric value of 1 in all locations having coordinates corresponding to values that meet the criterion represented by the intermediate relational selection tensor, and hold a numeric value of 0 in all other locations.

In these specific embodiments. the relational tensor product of the two relational tensors, such as two relational selection tensors or a relational selection tensor and a data-representing relational tensor, is formed by multiplying numeric values in corresponding coordinates of the relational tensors to produce numeric values for that coordinate in a resulting relational tensor. In the described embodiments, the relational tensors need not have complete correspondence in the domain of coordinates of the relational tensors along each of their orders. For such situations, the invention features a methodology for accommodating relational tensors with mismatched domains when performing relational tensor multiplication.

Furthermore, in the context of a restriction operation, the orders of a relational selection tensor may be expanded to match those of a data-representing relational tensor, as needed for the relational tensor multiplication operation, by adding the needed order to the relational selection tensor and associating each coordinate value in the added order with a replica of the existing orders of the relational tensor.

To simplify the process of relational tensor multiplication, the domains of coordinates along the orders of the relational selection tensor may be matched with the domains of coordinates along the orders of the data-representing relational tensor, by identifying any coordinates in an order of the first relational tensor, not found in the corresponding order of the second relational tensor, and adding any such coordinates to the order of the second relational tensor. This operation is then performed for coordinates in the order of the second relational tensor not found in the first relational tensor. When coordinates are thus inserted in a relational tensor, zero values are placed in all locations in the relational tensor corresponding to the added coordinate, indicating that the relation stored by the relational tensor has no tuples with the added coordinate value.

When forming a relational selection tensor for use with a data-representing relational tensor, the relational selection tensor may be built ab initio with orders, and coordinates on those orders, that are fully conforming to the data-representing relational tensor, thereby simplifying the relational tensor multiplication process.

Alternatively, the relational selection tensor may be generated at a minimal size to represent the selection criteria, and with any differences in the orders and domains of the selection and data-representing relational tensor being resolved during the order expansion and relational tensor multiplication process.

To generate statistics for a restriction operation, after relational tensor multiplication the resulting order n relational tensor is contracted in an iterative manner, each iteration contracting the order n relational tensor along an eliminated order, to generate a result having n−1 orders. The values in the n−1 order result are equal to the sum of the values lying along the eliminated order at the same n−1 order coordinate. To convert a relational tensor to a scalar value, the relational tensor is contracted along each of its orders until, after the last contraction, a single scalar value is produced, representing the sum of all values at all coordinates in the original order relational tensor.

In one detailed implementation described below, an order-n relational tensor (where n≧2) is contracted along an eliminated order, by forming an order n−1 relational identity tensor conforming in size to the order-n tensor along the order to be eliminated and n−2 other orders. The relational identity tensor holds numeric values of 1 in all locations. A matrix product is then formed between the order n−1 relational identity tensor and the order-n relational tensor to be contracted, by forming inner products of vectors selected from the relational identity tensor and corresponding vectors of the original n-order relational tensor, the vectors taken along the eliminated order, and placing the resulting scalar values in an order n−1 result, at the order n−1 coordinate from which the vectors were taken.

In this embodiment, a first order relational tensor (i.e., a vector) is contracted to a scalar by forming a first order relational identity tensor (i.e., a vector) conforming in size to the first order relational tensor and holding numeric values of 1 in all locations. Then an inner product is formed between the relational identity tensor and the original first order relational tensor to form a scalar value.

In a second embodiment, the user query specifies a join operation including a join criterion operating on attributes of two relations. In this embodiment, the statistic indicates the number of tuples that will be produced by the join operation. To generate the statistic, data-representing relational tensors for the first and second relations to be joined are contracted along all orders other than the order corresponding to the attribute operated upon in the join criterion, e.g. using the method described above, to form first order intermediate relational tensors (i.e., vectors). The statistic is formed by accumulating the products of the numeric values in corresponding coordinates in the intermediate relational tensors.

In the disclosed particular embodiment. the user query specifies multiple join operations, and statistics are generated for two or more join operations and used to determine an order in which said join operations are performed, e.g., the join operation with the lowest statistic is performed first.

To facilitate generation of statistics from the intermediate relational tensors, in one embodiment, the intermediate relational tensors are expanded to a common domain in the attribute operated upon by the join criterion, and then an inner product is formed upon the expanded intermediate relational tensors. Expanding the intermediate relational tensors to a common domain in this manner simplifies the subsequent step of accumulating products of corresponding coordinates in the two relational tensors, because the expanded relational tensors will to have matchable coordinates. However, such expansion is not necessary—if the relational tensor domains are not expanded, during computation of the statistic, any coordinates found in one relational tensor and not the other are ignored.

In the disclosed specific embodiment, after domain expansion, the coordinates of the intermediate relational tensors are arranged the same way, so that the computation of the statistic may proceed by forming an inner product between vectors representing the two first order intermediate relational tensors to form the statistic. However, the accumulation may also be performed upon relational tensors that do not have the same arrangement of coordinates.

In a third embodiment, the user query specifies a particular operation on records meeting or not meeting a restriction criterion. In this embodiment, the statistic indicates a number of tuples meeting the restriction. Implementation of the operation may be optimized by use of the statistic. For example, deletion of records may be performed by evaluating each tuple in a relation to determine whether the restriction criterion is met, and, based on the value of the statistic, either (a.) deleting a tuple from the relation based upon whether the restriction is met by the tuple, or (b.) transferring a tuple to a replacement relation based upon whether the restriction is met by the tuple. Insertion of tuples in a first relation that meet a restriction criterion, into a second relation, involves generating a statistic on the number of tuples that meet the restriction criterion, and based on the number, either (a.) scanning the first relation for tuples meeting the restriction and adding those tuples to the second relation, or (b.) replicating the second relation and deleting from the replica tuples not meeting the restriction criterion, and then merging the replica with the first relation. Updating tuples in a relation that meet a restriction criterion, involves generating a statistic on the number of tuples that meet the restriction and, based on the number, either (a.) rebuilding the relation by transferring tuples not meeting the restriction to a new version of the relation, and then updating the remainder, or (b.) directly updating the tuples meeting the restriction criterion.

In the specific embodiment that is described below, the statistic used in this third embodiment is generated in the same manner as described above in connection with the first embodiment.

To generate results for a query having a restriction criterion, a relational selection tensor is formed, representing the criterion of the restrict operation, and then a relational tensor product of the relational selection tensor and data-representing relational tensor is computed. The tuples meeting the criterion in the query can then be realized from the relational tensor product. The relational selection tensor is built in the manner described above from a plurality of criteria each applicable to a single attribute, by forming intermediate relational selection tensors representing each such criterion, and forming a relational tensor product of the intermediate relational selection tensors to form the relational selection tensor representing the plurality of criteria of the user query.

To perform a restrict operation requesting return of only unique values in one or more particular attribute of tuples matching a query, such as the SQL SELECT DISTINCT operation, the result relational tensor is normalized. Relational tensor normalization involves replacing all non-zero values in all locations in the relational tensor with a value of 1.

To perform a restrict operation requesting return of only one or more attributes of tuples matching a query, such as is done in the SQL PROJECTION operation, the result relational tensor is contracted along all orders other than those corresponding to the attributes to be returned.

Turning now to FIG. 3, the operation known as the "tensor product" 100 will be described. Generally speaking, the tensor product operation forms a result tensor from two operand tensors by generating the products of numeric values at corresponding coordinates in the two tensors, and placing the products at a corresponding coordinate in a result tensor.

The tensor product is a generalized operation that operates upon two tensors having conforming orders. Relational operations that use the tensor product will include steps to conform the orders of the tensors prior to invoking the tensor product. The steps needed to conform the orders of tensors will be different for tensors having different meanings; therefore, the generalized tensor product operation does not conform the orders of tensors, but rather requires that the orders be conformed prior to invoking the generalized tensor product.

Thus, in a first step 102 of the generalized tensor product operation, the operand tensors T1 and T2 that are supplied to the tensor product, are evaluated to determine whether they have conforming orders. Specifically, tensors are evaluated to determine whether the number of orders and the attributes associated with those orders are the same. It should be noted that the coordinates along the orders in the two tensors need not be the same, i.e., the domains of the tensors along their orders need not be the same. If the orders of tensors T1 and T2 conform, but have different domains, the generalized tensor product operation will take the appropriate steps to conform the domains of the orders during calculation of the tensor product. If, however, the orders of T1 and T2 do not conform, then in step 104 an error is returned, indicating that the orders of the tensors are incompatible and that the tensor product operation will therefore not proceed.

Assuming the orders of the tensors T1 and T2 are compatible, in a next step 106, a result tensor Tr is formed having the same orders and coordinates as the first tensor argument T1. All numeric values in the result tensor are initialized to values of zero. Next, in step 108, a multi-pass loop is initiated, in which all of the coordinates in the operand tensors T1 and T2 will be parsed to form the result tensor. A loop index N is initiated to a value of 1 in step 108.

In a first step 112 of this multi-pass loop, a coordinate in tensor T1 along order N is selected. Then in step 114 tensor T2 is evaluated to determine whether T2 has the selected coordinate along the same order N. If not, then in step 116 a flag is set for later use, indicating that the two tensors did not both have the currently selected coordinate in order N. At the same time, the current value of N is also stored in association with the flag, for later use in determining the order at which the flag was set. It will be noted that the flag may already have been set in a previous pass through step 116; if this is the case, the value of N stored in the previous pass through step 116 is not overwritten. After step 118, or immediately after step 114 if T2 has a matching coordinate along order N, in step 118 the loop index N is compared to the orders of the tensors T1 and T2. If N is less than the order of the tensors T1 and T2, then in step 120, the value of N is incremented, and processing returns to step 112 to select a coordinate in T1 alone the next order of T1.

The foregoing steps are repeated until a coordinate has been selected in each order of tensor T1, and a determination has been made whether there is a matching coordinate in tensor T2 for each of these coordinates in T1. After this has been done, the value of N will be equal to the order of the tensors T1 and T2. At this point, processing will proceed from step 118 to step 122, in which the flag discussed with reference to step, 116 is evaluated to determine whether matching coordinates have been found in tensors T1 and T2 for the current coordinate. If the flag is not set, then processing continues to step 124 in which the selected coordinates in the orders of tensors T1 and T2 are used to retrieve numeric values from those two tensors. The retreived numeric values are then multiplied, and the resulting numeric value is stored in the result tensor Tr at the selected coordinates.

After step 124, in step 126 it is determined whether all coordinates in tensor T1 at the current order N (the highest order of T1) have been selected and processed. If not, then processing continues to step 127, in which the flag set in step 116 is cleared, if the flag was set while N had its current value. If the flag was set when N had a lower value than the current value, the flag is not cleared. After step 127, processing returns to step 112, where another coordinate in tensor T1 along the current order N is selected, and processed.

Returning to step 126, after all coordinates in tensor T1 in its highest order have been selected and processed through the above steps, processing will proceed from step 126 to step 128, in which it is determined whether all coordinates in tensor T2 at the current order N (the highest order of T2) have been selected and processed. If not, then in step 130, a coordinate in T2 along order N is selected. Since all coordinates in T1 have already been selected, it is known at this point that the selected coordinate from T2 is not in the highest order of T1. Accordingly, processing proceeds to step 132, in which it is determined whether the result tensor Tr has the selected coordinates.

The first time that processing arrives in this manner at step 132, the result tensor Tr will not have the selected coordinates, for the reason that result tensor Tr is initially created as a duplicate of the orders and coodinates of tensor T1. Thus, processing will continue to step 134, in which the selected coordinates are added to result tensor Tr. Adding coordinates for a particular location to a tensor, such as is done in this step, involves first identifying an order that is missing one of the coordinates. Then, the coordinate is added to the order, and a duplicate is created of all other orders of the tensor other than the order in which the coordinate is being added. When this duplicate is created, numeric values of 0 are inserted in all locations added to result tensor Tr. This process is repeated for every order that is missing one of the coordinates to be added. After all of the coordinates have been found or added to the result tensor Tr, the required processing for the current coordinate is complete; a 0 value will be left at the location in Tr corresponding to the added coordinates, for the reason that there is no matching value for the coordinate in tensor T1. Accordingly, after step 134, processing returns to steps 126 and 128, in which it is determined whether all coordinates in tensors T1 and T2 have been selected, and if not, another is selected in step 130 and the selected coordinate is evaluated in step 132 to determine whether it is in the result tensor Tr.

It will be noted that, typically, the operations of step 134 to add coordinates to the result tensor Tr, will add many more locations than the single location that was not found in step 132. Accordingly, in some subsequent passes through step 132, the selected coordinates will be found in the result tensor Tr even though they are not in the operand tensor T1. In this situation, processing continues from step 132 directly back to step 126.

Returning to step 122, if the flag discussed above is set when processing reaches step 122, this indicates that tensor T1 had a selected coordinate along one of its orders, that is not found in T2. In this circumstance, processing also proceeds to step 132 to confirm that the missing coordinate has been inserted into tensor Tr, and if not insert it in step 134, and then returns to step 126 and 128 to select additional coordinates in tensor T1 or T2, as required.

Through the above steps, ultimately in step 128 it will be determined that all coordinates in tensors T1 and T2 at the current order have been previously selected. When this occurs, processing will proceed from step 128 to step 136, in which it is determined whether the current value of N is greater than 1. If N is equal to 1, then all locations in all orders of the tensors T1 and T2 have been processed, and the tensor product operation is completed. If, however, N is greater than 1, then in step 138 the flag set in step 118 is cleared if the flag was set at the current value of N. If the value of N stored in step 116 indicates that the flag was set at a value of N lower than the current value, the flag is not cleared.

Next, in step 140, the value of N is reduced, and processing returns to step 126 to determine whether all coordinates in T1 along order N have been selected in the current pass, i.e., since the last time N had a value lower than its current value. It will be appreciated that the value of N will increment from 1 to a value equal to the number of orders in T1 and T2 multiple times, as the process of FIG. 3 evaluates each of the orders and coordinates of T1 and T2. Each time this process repeats, all of the coordinates along all of the higher orders are evaluated. Thus, there is a single pass through the first order of T1 and T2, and multiple passes through each of the higher orders of T1 and T2.

After all of these passes have been completed, the single pass through the first order of T1 and T2 will complete, and processing will continue from step 128 to step 136, at which point N will be equal to 1. In this circumstance, processing will continue to step 142 and be done.

Figure 4:
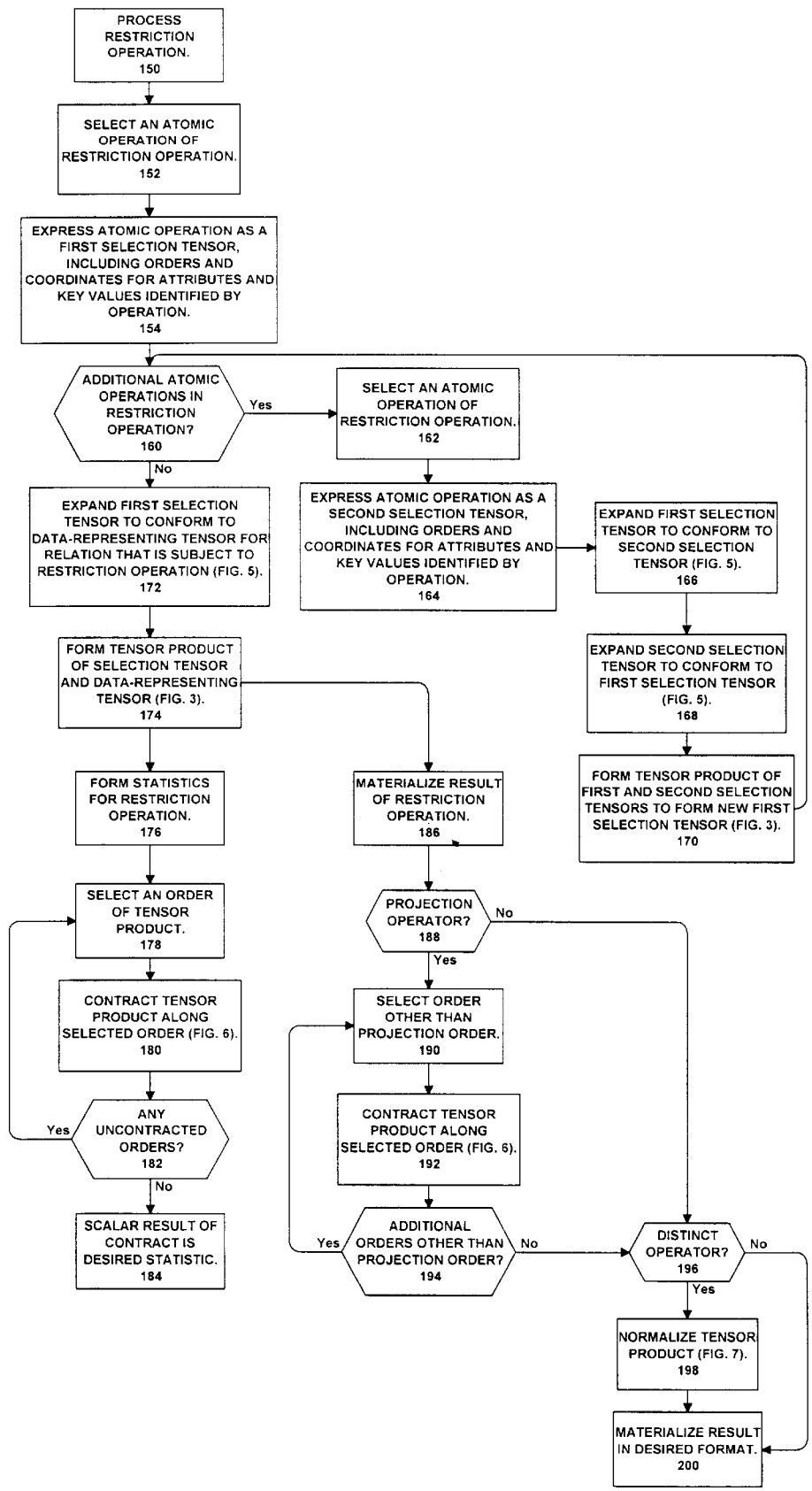
FIG. 4 is a flow chart of a process for performing a restrict operation operable upon a data-representing relational tensor by forming a suitable relational selection tensor and utilizing a relational tensor product to generate statistics for the restrict operation or to generate results for the restrict operation.

Referring now to FIG. 4, the use of the tensor product, and other operations to be defined below, can be described in the context of processing an SQL restriction operation 150 such as SELECT, SELECT DISTINCT, PROJECT, SELECT . . . LIKE SELECT . . . FROM etc. as well as generating statistics for such an operation. In a first step 152, the restriction operation is divided into atomic restriction operations. To do this, the restriction is rewritten and divided into specific clauses that are connected together by "AND" logical operations. Each atomic operation may include specific criteria applicable to attributes of a relation.

In a next step 154, an atomic operation is expressed as a selection tensor, that is, a tensor including only 0 or 1 values. The orders and coordinates of the selection tensor are those that are referenced in the atomic operation. For example, referring to FIG. 4A, there are shown two selection tensors built from atomic operations. The first selection tensor 156 reflects an atomic operation selecting tuples having a City attribute value of one of "Cincinnati, Ohio", "Glendale, Ohio", "Cleveland, Ohio" or "Columbus, Ohio". The second selection tensor 158 reflects an atomic operation selecting tuples having a Postal Code attribute value of one of "45246" and "55906". Note that these tensor are each order 1 tensors; they only identify coordinate values along the City order or Postal Code order, respectively. Furthermore, the only coordinate values identified along the relevant order are those subject to the selection criterion. Other coordinate values are not included in the relevant order.

Selection tensors can be created from relatively simple atomic expressions such as, e.g., City={"Cincinnati, Ohio" or "Glendale, Ohio" or "Cleveland, Ohio" or "Columbus, Ohio"}, which would generate the selection tensor 158, or may be generated from more complex atomic expressions, including expressions that do not identify attribute values. For example, a selection tensor could be made from an atomic expression LIKE "C*"; in this case, the domain of City values in the data-representing tensor that is subject to the criterion, would be interrogated to identify all values that meet the LIKE criterion, in this case including "Cincinnati, Ohio","Cleveland, Ohio" and "Columbus, Ohio". Then a selection tensor would be built in the form of tensor 158 identifying these coordinate values and associating each with a 1 value. Similarly, operators such as >(GREATER THAN), <(LESS THAN), >=(GREATER THAN OR EQUAL), and <(LESS THAN OR EQUAL) can be handled in a similar manner, by identifying those values in the domain of the relevant order of the data-representing tensor that meet the criterion. Compound expressions that are based on these expressions can also be handled, such as BETWEEN . . . AND . . . , which is equivalent to a GREATER THAN OR EQUAL and a LESS THAN OR EQUAL operation. Furthermore, negative restrictions such as NOT EQUAL can be satisfied in a similar way, by creating a selection tensor having coordinates for every value in the domain for the attribute subject to the NOT restriction, found in the data-representing subject to the restriction. Then, a 1 value is inserted for each coordinate that meets the restriction.

Restriction criterion logic can in include OR boolean operators as well as other more elaborate boolean operators such as XOR. These can also be handled since OR, XOR and any other boolean operator can be described using AND, based upon Black's Law that A AND B equals (NOT ((NOT A) OR (NOT B))). A XOR B can be expressed as (A AND NOT B) OR (B AND NOT A), which is equivalent via Black's Law to (NOT (NOT (A AND NOT B)) AND (NOT (B AND NOT A)))). Other transformations are also possible.

After creating a selection tensor for an atomic operation in the restriction, in step 160 it is determined whether there are additional atomic operations in the restriction. If so, then in step 162, an additional atomic operation is selected, and in step 164, the additional atomic operation is converted to a selection tensor. Here again, the selection tensor includes only the orders and coordinate values that are the subject of the selection criterion.

Figure 4A:
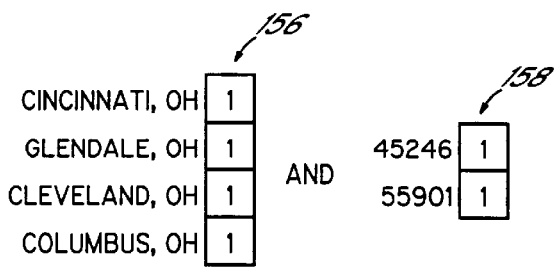
FIG. 4A is an illustration of combining two relational selection tensors applicable upon different orders of a data-representing relational tensor.
Figure 4B:
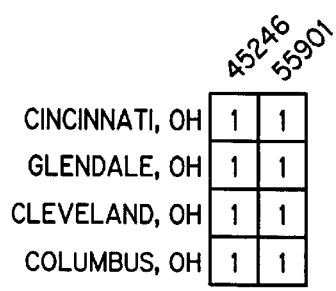
FIG. 4B is an illustration of the resulting relational selection tensor.

After step 164, in steps 166 and 168, the selection tensors created in the preceding steps are conformed to each other. Specifically, by relational tensor order expansion operation described below with reference to FIG. 5 (hereafter, an "order expansion" operation), each tensor has its orders expanded to include the orders referenced by the other tensor. Referring to FIGS. 4A and 4B,when the tensor 156 shown in FIG. 4A or the tensor 158 shown in FIG. 4A is conformed to the other respective tensor, the result is an order 2 tensor of the form shown in FIG. 4B. Interpreting the tensor of FIG. 4B, it selects any value having any of the four city values identified with reference to tensor 156 of FIG. 4A and any of the two postal code values identified with reference to tensor 158 of FIG. 4A.

Figure 5A:
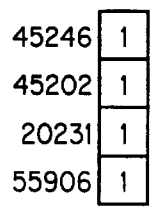
FIG. 5A is an illustration of a relational selection tensor.
Figure 5B:
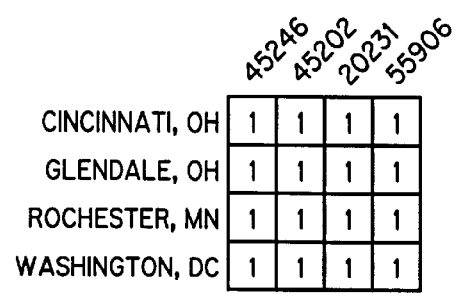
FIG. 5B is an illustration of the relational selection tensor of FIG. 5A after having undergone order expansion to conform to the data-representing tensor of FIG. 3A.
Figure 5C:
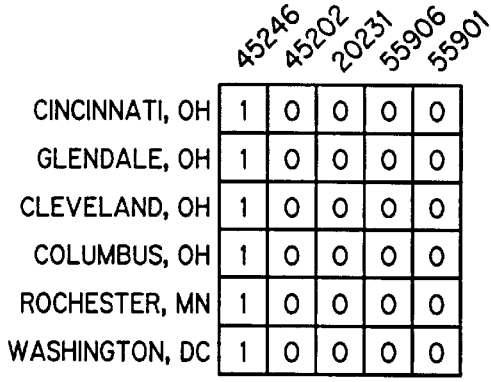
FIG. 5C is an illustration of a relational selection tensor produced from a relational tensor product of the relational selection tensors shown in FIGS. 4B and 5B.
Figure 5:
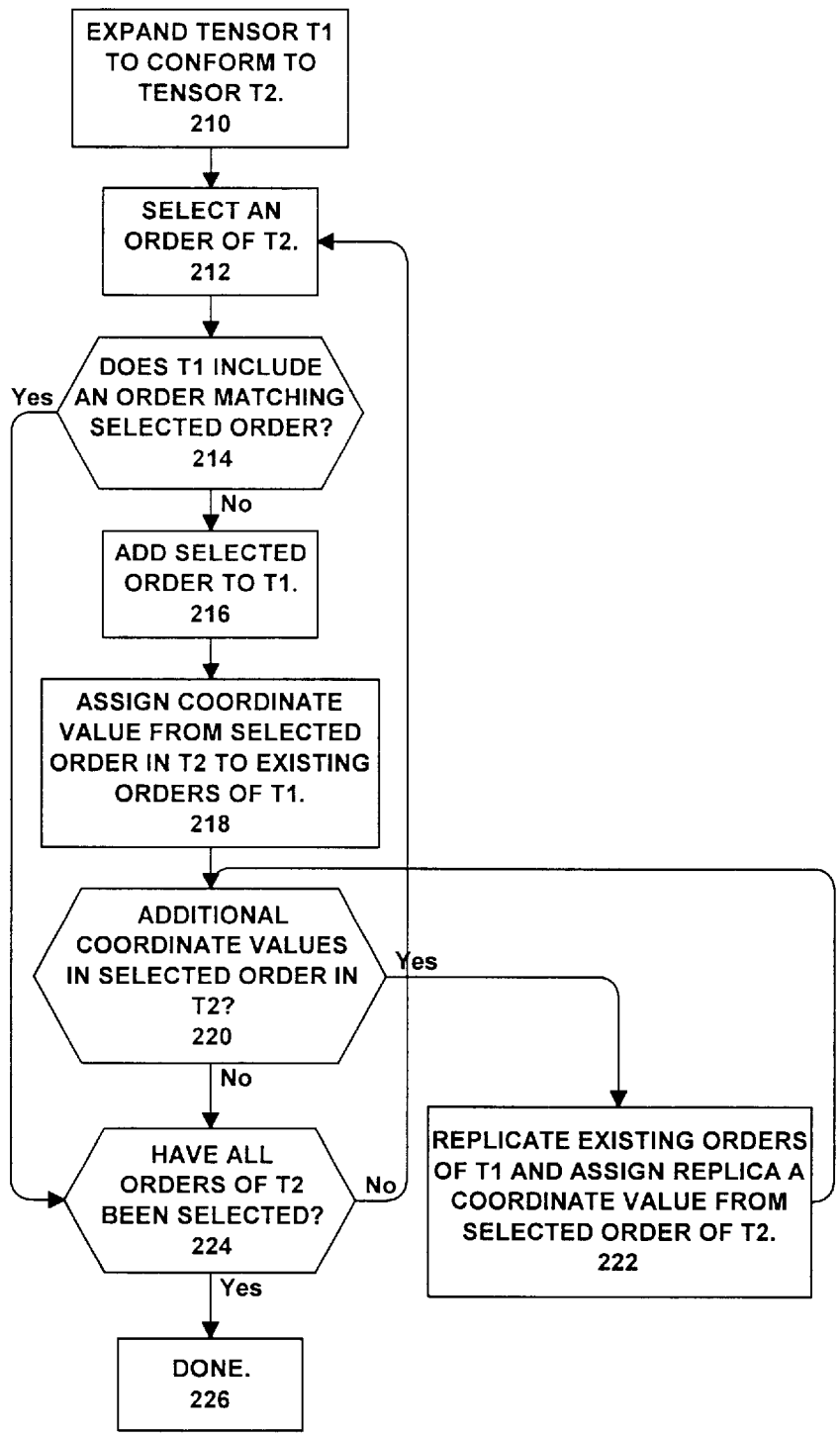
FIG. 5 is a flow chart of a process for expanding the domain(s) of a first tensor to conform to the domains of a second tensor, as is utilized in the process of FIG. 4.

Referring to FIG. 5, the operation 210 for expanding a first tensor T1 to conform to a second tensor T2 can be explained in greater detail. This operation involves replicating the existing orders of the first tensor for each coordinate in each order of the second tensor that is not in the first tensor. This operation is in general similar to performing matrix multiplication of the first tensor T1, by an identity tensor having only numeric values of 1 in all locations, and having all of the orders and coordinates of T1, and all of the additional orders and coordinates in those orders that are in T2 but not in T1.

A procedural description of this process is illustrated in FIG. 5. In a first step 212, an order of T2 is selected, and in step 214, T1 is evaluated to determine whether it has the selected order. If not, then in step 216, the selected order is added to T1, by appropriately modifying the data structure representing T1. In step 218, a coordinate value from the selected order in T2 is assigned to the previously existing orders in T1 (i.e., those that existed prior to the addition of an order in step 216). Then, in step 220, it is determined whether the selected order in T2 has additional coordinate values. If so, then in step 222 the previously existing orders of T1 are replicated, and the replica is assigned to a coordinate value of the selected order of T2. Processing then returns to step 220 to determine whether there are still coordinate values in the selected order of T2 that have not been assigned replicas of the orders of T1. If so, processing returns to step 222. These two steps repeat until every coordinate value in the selected order of T2 has been assigned to a replica of the previously existing orders of T1.

After steps 220 and 222 complete the process of replicating previously existing orders of T1, in step 224, it is determined whether all of the orders of T2 have been evaluated. Processing also continues directly to step 224 from step 214 if T1 has the selected order in T2: In step 224, it is determined whether there are any orders of T2 that have not yet been selected. If so, processing returns from step 224 to step 212 to select another order of T2, and the process described above is repeated. After all orders in T2 have been selected, tensor T1 has been fully expanded to conform to tensor T2, and the process is done (step 226).

As a second example of the process of expanding the orders of a selection tensor, reference can be made to the selection tensor of FIG. 5A. This tensor includes a single order for the Postal Code attribute, and will select any tuples having a postal code of "45246", "55901 ", "20231" or "55906". Were this tensor to be expanded to conform, for example to the data-representing tensor shown in FIG. 3A, the result would be a tensor shown in FIG. 5B. Note that this tensor includes a replica of the single domain of the tensor of FIG. 5A, for each of the four coordinate values in the City order of the tensor shown in FIG. 3A. It can be further verified that the effect of performing tensor multiplication between the selection tensor shown in FIG. 5B and the data-representing tensor shown in FIG. 3A. would be to select those tuples having one of the four Postal Code value referenced above in connection with FIG. 5A.

Returning now to FIG. 4, after steps 166 and 168 in which the selection tensors are expanded to conform to each other, in step 170 a tensor product is formed using the selection tensors as operands. It can be confirmed that this tensor product will produce a resulting tensor representing the collective effect of the selection tensors that are input to the tensor product operation. For example, the tensor product of the selection tensor shown in FIG. 4B, with the selection tensor shown in FIG. 5B, would be a selection tensor as shown in FIG. 5C. This selection tensor would select only tuples having one of the city values discussed with reference to FIG. 5A, and one of the postal code values discussed with reference to FIG. 5B, and one of the postal code values reference with reference to FIG. 5C.

Following step 170, processing returns to step 160 to process additional atomic operations, if any, that were obtained from the original selection criterion. After all atomic operations have been processed, the processing of the restriction operation continues to step 172, in which the resulting selection tensor is expanded to conform to the data representing tensor for the relation that is the subject of the restriction operation, in accordance with the process described below with reference to FIG. 5. Then, in step 174, a tensor product is formed on the expanded selection tensor and the data representing tensor, in accordance with the operation described with reference to FIG. 3. The result, as noted above, is a new data-representing tensor that represents only those tuples that satisfy the restriction operation.

Following step 174, a variety of operations can be performed on the new data-representing tensor that has been created. A first operation 176 that can be performed, described with reference to steps 178 through 184, is to create statistics regarding the restriction criterion, specifically, the number of tuples in the identified relation that meet the restriction criterion. To form statistics, in step 178, an order of the tensor product formed in step 174 is selected, and in step 180, a relational tensor contraction operation, hereafter generally referred to as a tensor contraction or simply contraction operation, is used to contract the tensor along this order. This contraction operation is described below with reference to FIG. 6. After contracting the tensor along an order, in step 182 it is determined whether there are any uncontracted orders remaining in the tensor, and if so, processing returns to step 178 to select an uncontracted order and perform the contraction operation of FIG. 6 for that order. The result of this loop of steps is that, ultimately, the data-representing tensor created in step 174 will be contracted to a scalar value indicating the number of tuples in the relation represented by the tensor. This scalar result is the desired statistic, as indicated in step 184.

Referring now to FIG. 6, details of the contraction operation can be explained. The contraction operation eliminates an order from a tensor by eliminating the order and including all numeric values from the eliminated order in the remaining orders. Contraction has an effect similar to the matrix operation of multiplying the vector spaces that correspond to the orders of the tensor with corresponding co-vector spaces, which will accumulate numeric values from the contracted order and include them in the other orders.

A first step of a contraction operation 230, shown in FIG. 6, is to determine whether the order of the tensor is greater than 1. First order tensors are contracted by simply accumulating the sum of all numeric values at all coordinate values in the tensor, as is indicated at step 234. The resulting numeric or scalar value is then returned in step 236 as the result for the contraction operation.

Order 2 or higher tensors do not contract to scalars, but rather contract to tensors of the next lower order. The steps that achieve this begin with step 238 in which a result tensor is created, that conforms in its orders and coordinates to the input tensor, but without the order that is to be contracted. Then in step 240, a specific location along these orders is selected; specifically, the location is chosen by choosing coordinates along each of the order(s) of the tensor that are not going to be eliminated. In step 242, all numeric values in the order to be eliminated that reside at locations having the selected coordinates, are accumulated to form a scalar sum. In step 244, this sum is inserted into the result tensor at the selected coordinates. In step 246 it is determined whether there are other unique sets of coordinates in the non-eliminated orders that have yet to be selected. If so, processing returns to step 240 to select a new set of coordinates. After all coordinates have been selected and processed in this manner, all of the numeric values in the eliminated order have been compressed into the remaining orders. Accordingly, in this case, in step 248 the contraction operation is done, with the result tensor created in step 238 constituting the result of the contraction operation.

Figure 6A:
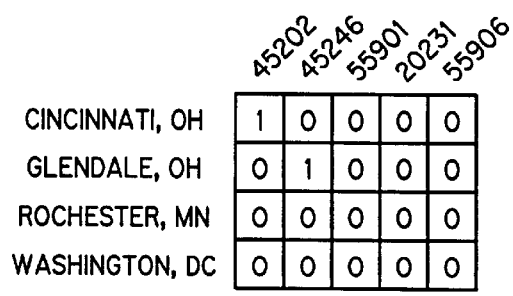
FIG. 6A is an illustration of a result relational tensor having two orders, identical to that shown in FIG. 3C.
Figure 6B:
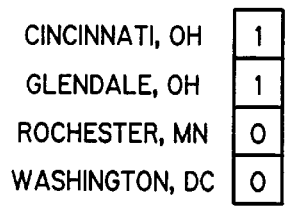
FIG. 6B is an illustration of a relational tensor having one order formed from the relational tensor of FIG. 6A in accordance with the order contraction process of FIG. 6.
Figure 6C:
FIG. 6C is an illustration of a scalar produced from the relational tensor of FIG. 6B in accordance with the order contraction process of FIG. 6.

Referring now to FIGS. 6A through 6C, a practical example of the contraction process will be useful. FIG. 6A illustrates a data-representing tensor, e.g., the data-representing tensor produced through the process described above with reference to FIG. 3C. FIG. 6B illustrates the order 1 tensor that is created by the process of FIG. 6 when the tensor of FIG. 6A is compressed by eliminating the "Postal Code" order. It should be noted that the numeric values in all coordinates along the postal code order of the tensor of FIG. 6A, have been accumulated in the corresponding locations in the order 1 tensor of FIG. 6B. FIG. 6C illustrates the scalar that is produced by a further compression of the tensor of FIG. 6B; the scalar value is the sum of the numeric values in each of the coordinates of the "City/State" order of the tensor of FIG. 6B.

Returning now to FIG. 4, another operation that may be performed, after creating a data-representing tensor representing the tuples that meet a restriction criterion, is to materialize these results in a desired fashion (step 186). The results may be materialized, as one example, as a simple listing or table of the tuples that meet the restriction criterion, which can readily be generated from a data-representing tensor as described above. However, more complex operations for realizing the results may also be specified by an SQL query, which are handled in accordance with FIG. 5.

Specifically, one such operation is a PROJECTION selection query, which requests that data for only a given attribute value or values should be returned. In step 188, it is determined whether the user query specifies such a PROJECTION operation. if so, then in steps 190 through 194, steps are taken to contract the tensor produced in step 174 so that it will represent only the requested attributes of the relation. Specifically, in step 190, the process selects an order of the data-representing tensor other than the order(s) requested in the projection operation. Then in step 192, the data-representing tensor is contracted along the selected order, as described with reference to FIG. 6). Finally, in step 194, it is determined whether there are additional orders to be contracted, and if so, processing continues to step 190. This sequence of steps 190, 192 and 194 will be repeated until all orders other than the projection order are eliminated from the data-representing tensor, with the numeric values from those orders included in the orders that remain. The results of the PROJECTION operation can then be directly realized from the data-representing tensor.

A second operation that may be performed upon the results of a restriction operation is a DISTINCT selection query, which requests that only distinct tuple values should be returned. In step 196, it is determined whether the user query specifies such a DISTINCT operation. if so, then in step 198, a relational tensor normalization operation is performed normalize the tensor produced in step 174 so that it will represent only the unique tuples of the relation that meet the selection criterion. Specifically, in step 198, all numeric values greater than 1 are replaced with the value 1, so that the tensor when realized as tuples or a stream of data will not have any duplicate tuples.

After either or both of the PROJECTION and DISTINCT processing steps, in step 200 the results of the restriction operation are materialized, e.g. by producing tuples, a tabel, or other suitable format for output.

Figure 7:
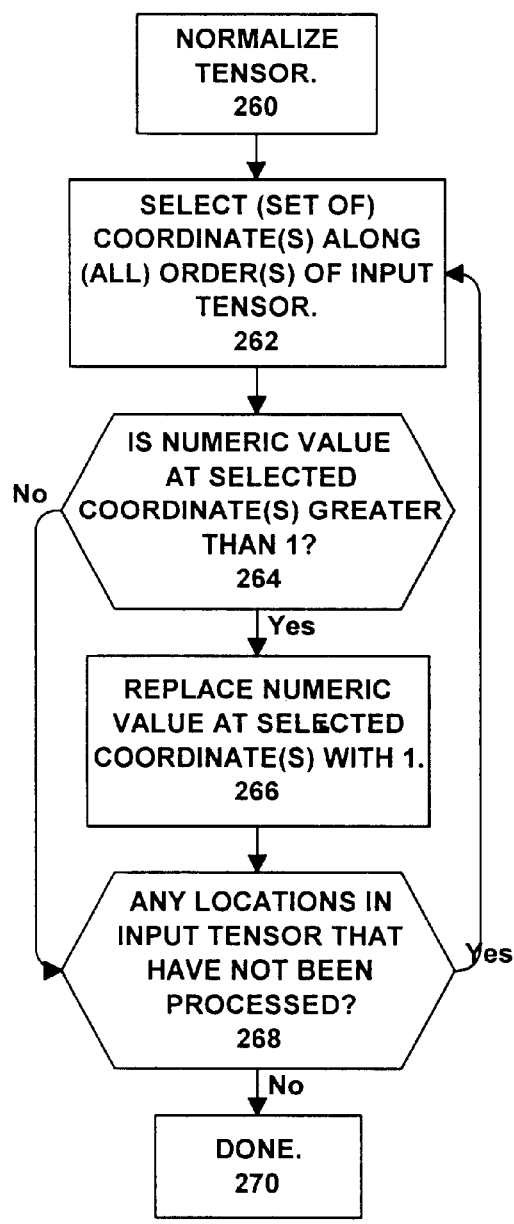
FIG. 7 is a flow chart of a process for normalizing a relational tensor, as is utilized in the process of FIG. 4 for DISTINCT restriction operations.

Referring now to FIG. 7, the relational tensor normalizing process 260, or simply the normalization process, can be explained. This process ensures that each numeric value in the tensor that is greater than 1 is normalized to the value 1. Thus, in step 262, a set of coordinates along all orders of the input tensor are selected, and in step 264, it is determined whether the numeric value at the selected coordinates is greater than 1. If so, then in step 266 the selected numeric value is replaced by 0. After step 266, or directly after step 264 if the numeric value at the current coordinate is 0 or 1, in step 268 it is determined whether there are any locations in the input tensor that have not yet been processed. The process of FIG. 7 will traverse all coordinates in a tensor to ensure that the tensor is fully normalized. After all coordinates have been normalized, the process is done, and after step 268, control passes to step 270 indicating that the normalization process is done.

Figure 8A:
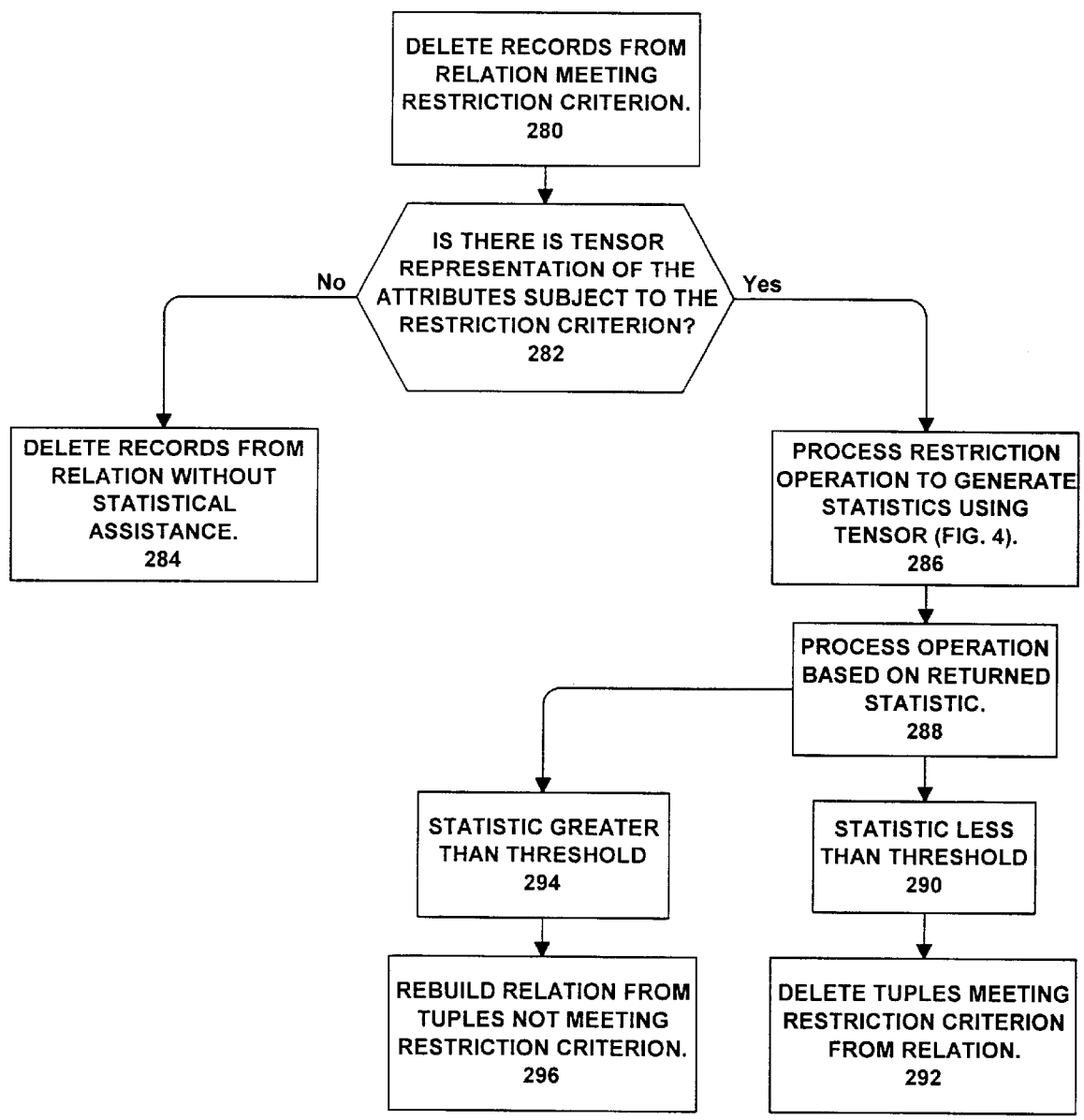
FIG. 8A is a flow chart of a process for deleting records from a relation based upon a restriction criterion, utilizing statistics formed by the process of FIG. 4.
Figure 8B:
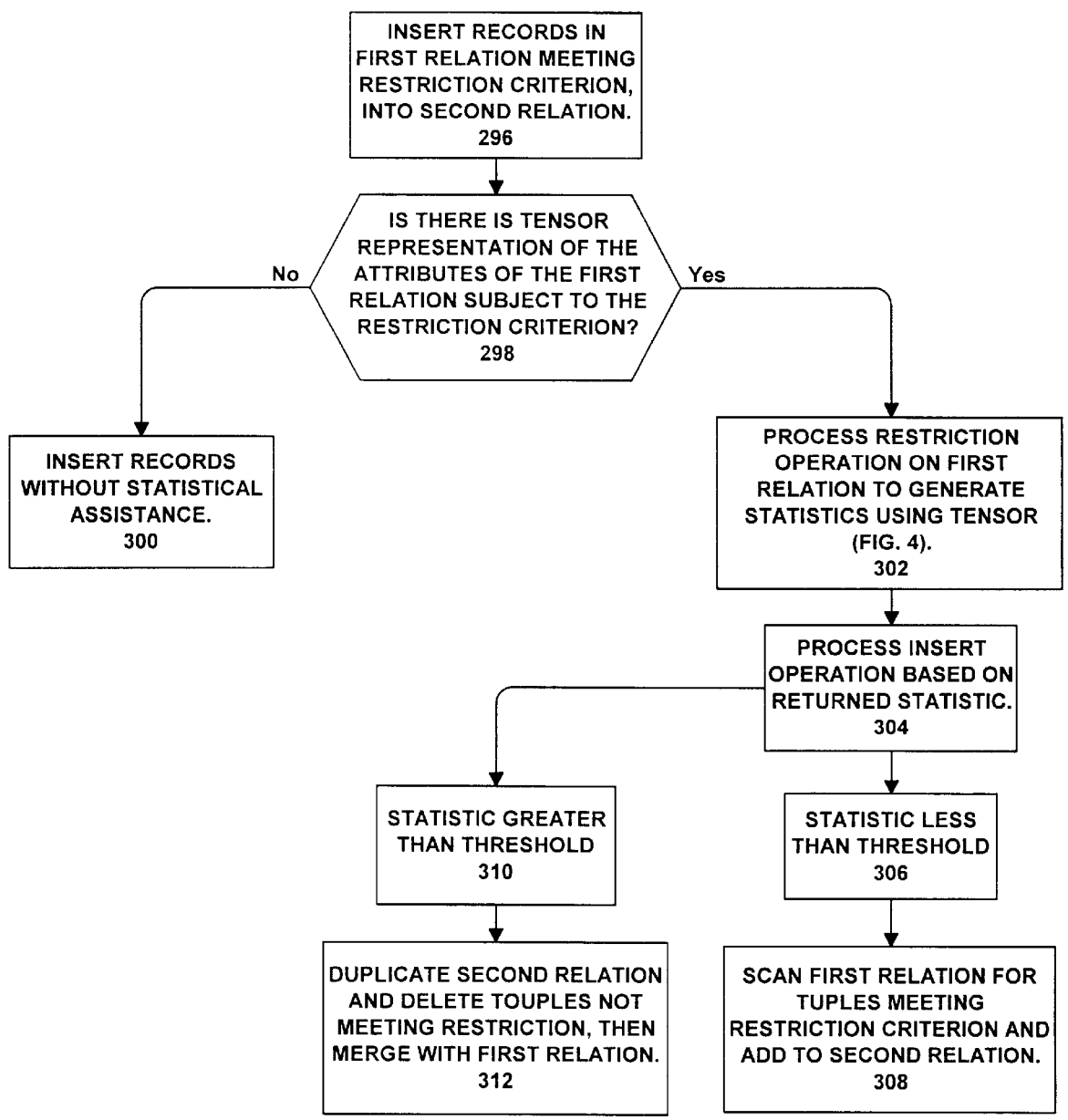
FIG. 8B is a flow chart of a process for inserting records in a relation that meet a restriction criterion, into a second relation, utilizing statistics formed by the process of FIG. 4.
Figure 8C:
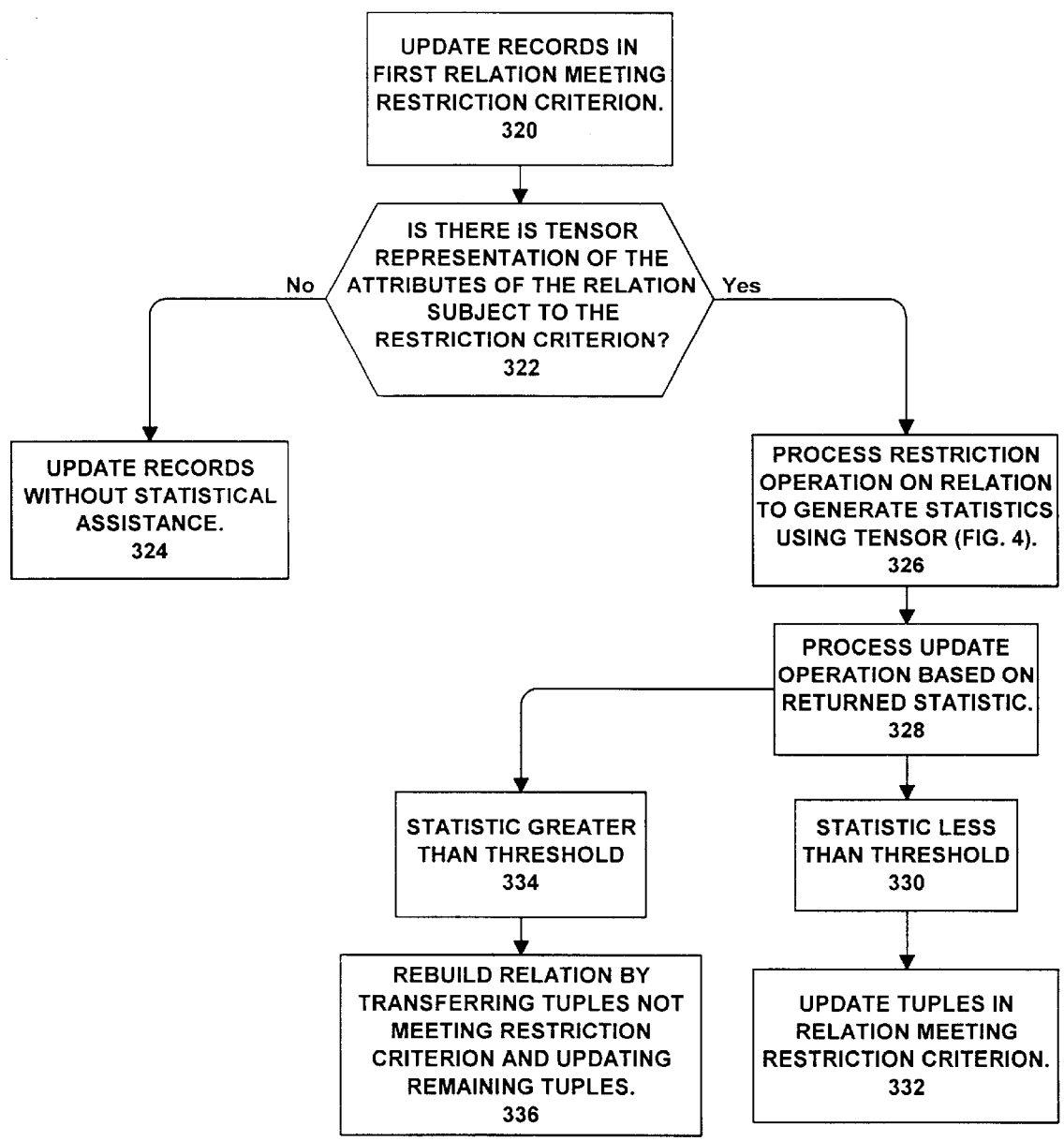
FIG. 8C is a flow chart of a process for updating records in a relation that meet a restriction criterion.

FIGS. 8A through 8C describe different scenarios in which statistics calculated using the process of FIG. 4 may be useful in increasing the efficiency of database updates. These scenarios can now be elaborated.

Referring to FIG. 8A, statistics may be used in deleting records (step 280). In a first step 282, it is determined whether there is a tensor defined for the orders and coordinates used in the selection criterion for the deletion operation. If not, then in step 284, the deletion operation is performed in a conventional manner, e.g. by scanning all records in the relation and deleting the records that meet the selection criterion, however, a suitable tensor is available (step 286), then the restriction operation described in connection with FIG. 4 is invoked, to generate a result tensor for analysis. Specifically, the number of hits formed by the restriction operation is input to a decision in step 288. If the number of hits is below a threshold value (step 290), then conventional deletion processing is performed in step 292. If, however, the statistic exceeds the threshold (step 294), then in step 296, to delete the identified records, the relation is rebuilt, using only those tuples that do not meet the restriction criterion. Where a sizeable percentage of the records of a relation are deleted, it may be more efficient to rebuild the relation with only the remaining records, than to delete the records from the existing relation. This is the approach that is used in the process of FIG. 8A where the statistics exceed the threshold value established in step 288.

Referring to FIG. 8B, statistics may also be used in inserting selected records from a second relation into a first relation (step 296). In a first step 298, it is determined whether there is a tensor defined for the orders and coordinates used in the selection criterion for selecting records from the second relation. If not, then in step 300, the insertion operation is performed in a conventional manner, e.g. scanning the second relation and adding matching records to the end of the first relation. If, however, suitable tensors are available (step 302), then the restriction operation described in connection with FIG. 4 is invoked, to generate a result tensor for analysis. Specifically, the number of hits formed by the restriction operation is input to a decision in step 304. If the number of hits is below a threshold value (step 306), then conventional processing is performed in step 308, by scanning the first relation for tuples that meet the criterion, and then adding those tuples to the second relation. If, however, the statistic exceeds the threshold (step 310), then in step 312 the entire second tensor is replicated, and then tuples not meeting the criterion are deleted, and finally the result is appended to the first tensor. It will be appreciated that this approach may be more efficient than moving records individually, if most of the tuples in the second relation are to be copied to the first relation.

Referring to FIG. 8C, statistics may also be used in updating records in a relation that meet a restriction criterion (step 320). In a first step 322, it is determined whether there is a tensor defined for the orders and coordinates used in the operation. If not, then in step 324, the tensor update operation is performed in a conventional manner, e.g. updating the tuples matching the selection criterion as they are found in the tuples. If, however, suitable tensors are available (step 326), then the restriction operation described in connection with FIG. 4 is invoked, to generate a result tensor for analysis. Then, the number of hits formed by the restriction operation is input to a decision in step 328. If the number of hits is below a threshold value (step 330), then conventional processing is performed in step 332, by scanning the relation for tuples that meet the criterion, and updating those tuples. If, however, the statistic exceeds the threshold (step 334), then in step 336 the entire tensor is rebuilt, and as it is rebuilt, tuples not meeting the selection criterion are not included. This operation may prove to be more efficient than the conventional approach of steps 324 and 332.

Figure 9:
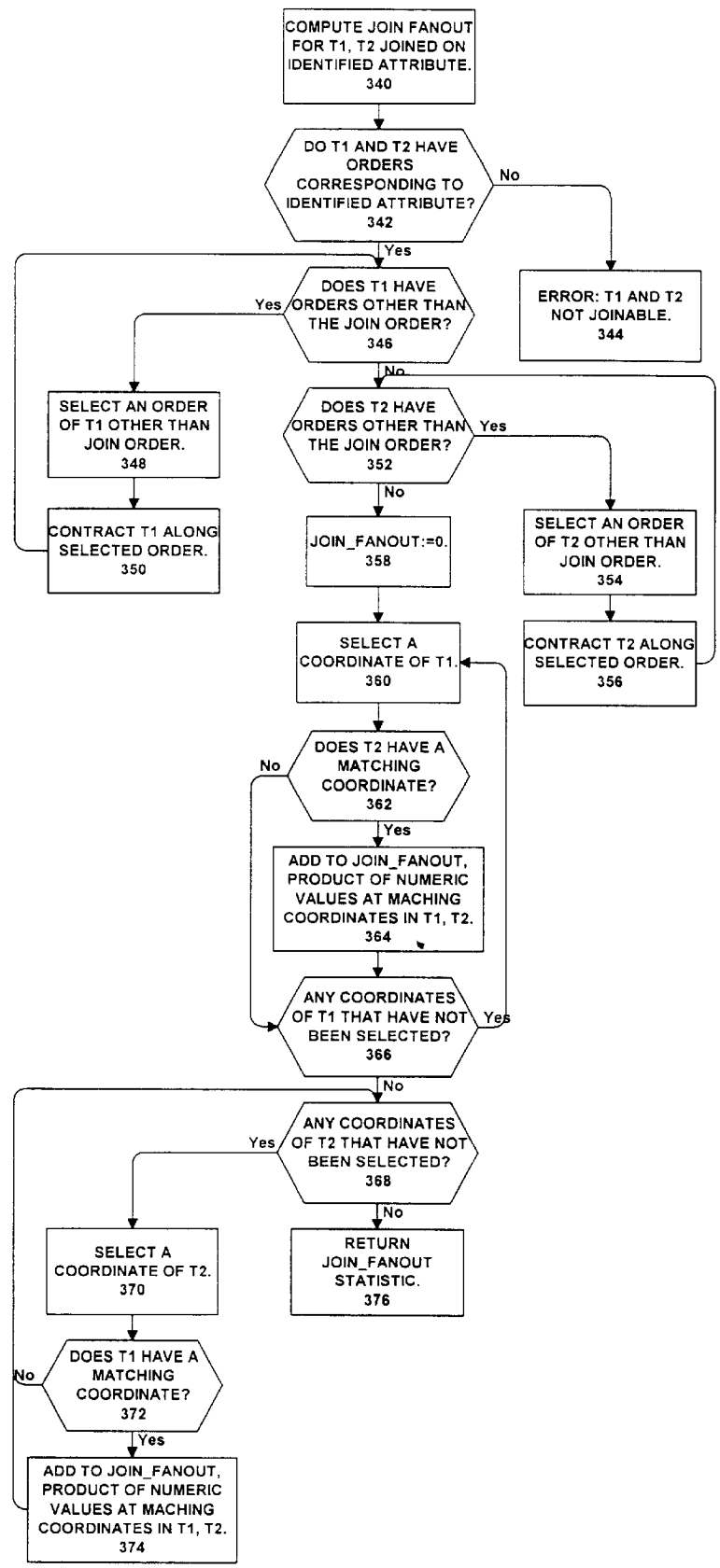
FIG. 9 is a flow chart of a process for computing a statistic on the fanout of a join operation performed on first and second relations on a given join attribute.

Referring now to FIG. 9, statistics may also be generated for other operations not involving restriction. Specifically, FIG. 9 illustrates a process 340 for generating join fanout statistics for a join operation operating on two relations. These statistics indicate the number of tuples that will be produced if the join operation is performed. Such statistics can be used to optimize the execution of a join operation. For example, if a multi-way join is requested by the user, e.g., a first relation is to be joined on a given attribute with a second relation, and then the second relation is to be joined on a given attribute with a third relation, it is useful to know the join fanout, i.e., number of intermediate results that will be produced by, the join of the first and second relations as compared to the join fanout of the join of the second and third relations. As noted above, when processing a compound SQL query, it is most efficient, generally speaking, to perform first those parts of the query that produce the smallest solution set of tuples, because doing so minimizes the number of intermediate results that must be produced, stored, and then processed in later parts of the query. Accordingly, a join fanout statistic, indicating the number of tuples that will be produced by a join of two given relations on a specific attribute, can be substantially useful in determining the appropriate manner in which to process the join and other operations relating to the join in a compound SQL query.

To use tensor representations to compute a join fanout statistic for a join of relations represented by tensors T1 and T2, on an identified attribute, in a first step 342 it is determined whether tensors T1 and T2 both include orders corresponding to the join attribute. If not, then T1 and T2 are not joinable on this attribute and an error is returned (step 344). If T1 and T2 do have the necessary order, then a sequence of steps is performed to contract T1 and T2 along all of their other orders. Specifically, in step 346 it is determined whether T1 has orders other than the join order. If so, then in step 348 one of the other orders is selected and in step 350 the contraction operation discussed above with reference to FIG. 6 is used to contract T1 along the selected order. Processing then returns to step 346 to determine if there are other orders to be contracted. This process continues until T1 is contracted to an order 1 tensor having on the order upon which the join is to be performed. At that point, the same is done to tensor T2. Specifically, in step 352 it is determined whether T2 has orders other than the join order. If so, then in step 354 one of the other orders is selected and in step 356 the contraction operation discussed above with reference to FIG. 6 is used to contract T2 along the selected order. Processing then returns to step 352 to determine if there are other orders to be contracted. This process continues until T2 is also contracted to an order 1 tensor having on the order upon which the join is to be performed.

The contracted versions of T1 and T2 are then ready for use in computing the join_fanout statistic. The operation used to generate this statistic has some similarity to an inner product of two vectors. In an inner product, corresponding components of two vectors are multiplied and the products are summed to produce a scalar value. In the context of two order 1 tensors T1, this would be a complete description of the steps for computing a join_fanout were the tensors to have the same domains along their common order and have along that order, the same ordering of coordinates. In a generalized case, however, neither may be true. Accordingly, the operations needed to comptue the join_fanout statistic for the two tenors will be described herein in a manner independent of the domain and ordering of that domain in the two tensors.

Specifically, in a first step 358, the join_fanout statistic initialized to a value of zero. Then in step 360, a coordinate of T1 on the join order is selected, and in step 362 it is determined whether T2 has a matching coordinate on the join order. If so, then in step 364, the numeric values at these coordinates are multiplied, and the product is added to the current value of the join_fanout statistic. Thereafter, or immediately after step 362 if there is no matching coordinate in T2, in step 366 it is determined whether there are any coordinates of T1 that have not yet been selected. If so, then processing returns to step 366 to select these additional coordinates. After all coordinates of T1 have been selected and processed, then processing continues to step 366 to step 368, in which coordinates of T2 are processed.

Specifically, in step 368, it is determined whether there are any coordinates of T2 that have not yet been selected. If so, then processing continues to step 370 in which a coordinate of T2 on the join order is selected. Next, in step 372 it is determined whether T1 has a matching coordinate on the join order. If so, then in step 374, the numeric values at these coordinates are multiplied, and the product is added to the current value of the join_fanout statistic. Thereafter, or immediately after step 372 if there is no matching coordinate in T1, in step 368 it is again determined whether all coordinates of T2 have been selected and processed. After all coordinates of T2 have been selected and processed, then processing continues to step 376, and the computed join_fanout statistic is returned, and then can be used in deciding how to complete the join operation.

The invention in its broader aspects is not limited to the specific details, representative apparatus and method, and illustrative example shown and described. Accordingly, departures may be made from such details without departing from the spirit or scope of applicant's general inventive concept.

What is claimed is:

1. A method of performing a query having a criterion in a relational database system, comprising:

storing a relation comprising a plurality of tuples formed over a plurality of attributes, in a multi-order relational tensor, wherein orders of said multi-order relational tensor correspond to individual attributes, and coordinates along an order of said multi-order relational tensor correspond to values of the corresponding attribute, and numeric values at coordinate locations within said multi-order relational tensor represent a count of tuples in said relation having the attribute values that correspond to the coordinates of the numeric value along the orders of the multi-order relational tensor, processing said multi-order relational tensor to generate a statistic relating to said criterion in said query, and performing the query in the memory of a computer system by determining, from among two candidate approaches, an approach to use in processing said query based on said statistic.

2. The method of claim 1 wherein said statistic for the query is generated by summing numeric values at coordinate locations matching a criterion in said query.

3. The method of claim 1 wherein said query requests deletion of tuples meeting said criterion from said relation, and performing the query comprises, based on the statistic, either (a.) deleting a tuple from the relation based upon whether the criterion is met by the tuple, or (b.) transferring a tuple to a replacement relation based upon whether the criterion is met by the tuple.

4. The method of claim 1 wherein said query requests insertion of tuples in said relation that meet said criterion, into a second relation, and performing the query comprises, based on the statistic, either (a.) scanning said relation for tuples meeting the criterion and adding those tuples to the second relation, or (b.) replicating said relation and deleting from the replica tuples not meeting the criterion, and then merging the replica with the second relation.

5. The method of claim 1 wherein said query requests updating of tuples in said relation that meet said criterion, and performing the query comprises, based on the statistic, either (a.) rebuilding the relation by transferring tuples not meeting the criterion to a new version of the relation, and then updating the remainder, or (b.) directly updating the tuples in the relation that meet the criterion.

6. The method of claim 1 wherein said query requests a join operation operating on attributes of two relations, said first and second relations being represented as first and second multi-order relational tensors, and generating said statistic comprises forming first order intermediate relational tensors from said first and second relational tensors. and accumulating the products of the numeric values in corresponding coordinates in the intermediate relational tensors.

7. The method of claim 1 wherein said query specifies multiple join operations, and further comprising generating statistics for said multiple join operations, wherein performing the query comprises, based on the statistics for said multiple join operations, determining an order in which said join operations are performed, and performing the join operations in the determined order.

8. The method of claim 1 wherein said query comprises a restriction query having a criterion.

9. The method of claim 8 wherein said query comprises a query having operations selected from the group of SQL operations including DISTINCT, PROJECTION, EQUALS, LESS THAN, LESS THAN OR EQUAL, GREATER THAN, GREATER THAN OR EQUAL and LIKE.

10. The method of claim 8 wherein generating said statistic comprises forming a relational selection tensor representing the criterion of the restriction query, and forming a relational tensor product of said relational selection tensor and said multi-order relational tensor storing said relation, and converting said relational tensor product to a scalar value.

11. The method of claim 10 wherein forming a relational selection tensor comprises building said relational selection tensor from a plurality of criteria derived from the criterion of said restriction query.

12. The method of claim 11 wherein building said relational selection tensor comprises forming intermediate relational selection tensors representing each of said plurality of criteria, and forming a relational tensor product of the intermediate relational selection tensors to form said relational selection tensor representing the plurality of criteria derived from the criterion of the restriction query.

13. The method of claim 10 wherein said relational selection tensor is a relational tensor having orders that are compatible with orders in said multi-order relational tensor storing said relation, and holding only numeric values of one or zero.

14. The method of claim 13 wherein said relational selection tensor holds a numeric value of one in those coordinates corresponding to tuple values meeting the criterion in the query, and holds a numeric value of zero in those coordinates corresponding to tuple values not meeting the criterion in the query.

15. The method of claim 10 wherein the relational tensor product of two relational tensors, tensor, is formed by multiplying numeric values in corresponding coordinates of the relational tensors to produce numeric values for that coordinate in a resulting relational tensor.

16. The method of claim 15 wherein the relational tensors operated upon by the relational tensor product do not have complete correspondence in the domain of coordinates of the relational tensors along each of their orders, and wherein forming the relational tensor product further comprises accommodating relational tensors with mismatched domains.

17. The method of claim 10 wherein orders of said relational selection tensor are expanded to match those of said multi-order relational tensor, by adding a needed order to the relational selection tensor and associating each coordinate value in the added order with a replica of the existing orders of the relational selection tensor.

18. The method of claim 17 wherein the domains of coordinates along the orders of said relational selection tensor are matched with the domains of coordinates along the orders of said multi-order relational tensor, by identifying any coordinates in an order of the relational selection tensor not found in the corresponding order of the multi-order relational tensor, and adding any such coordinates to the order of the second relational tensor.

19. The method of claim 18 wherein zero values are placed in all locations of said relational selection tensor corresponding to added coordinates.

20. The method of claim 10 wherein the domains of coordinates along the orders of said multi-order relational tensor are matched with the domains of coordinates along the orders of said relational selection tensor, by identifying any coordinates on an order of the multi-order relational tensor not found in the corresponding order of the relational selection tensor, and adding any such coordinates to the order of the relational selection tensor.

21. The method of claim 10 adapted to form statistics for a restrict operation requesting return of only unique values in one or more particular attribute of tuples matching a query, further comprising normalizing a result of said relational tensor product, by replacing all non-zero values in all locations in said result with a value of one.

22. The method of claim 1 wherein said query includes an SQL SELECT DISTINCT operation.

23. The method of claim 1 wherein said query includes an SQL SELECT LIKE operation.

24. The method of claim 10 adapted to perform a restrict operation requesting return of only one or more attributes of tuples matching a query, further comprising
contracting a result of said relational tensor product along all orders than those corresponding to the attributes to be returned.

25. The method of claim 24 wherein said query includes an SQL PROJECTION operation.

26. The method of claim 10 wherein converting said relational tensor product to a scalar value comprises contracting said relational tensor product along an eliminated order, by producing a result relational tensor not having the eliminated order, and storing values in the result relational tensor that are equal to the sum of the values lying along the eliminated order at the same coordinates.

27. The method of claim 26 wherein converting said relational tensor product to a scalar value comprises contracting said relational tensor product along each of its orders until, after the last contraction, a single scalar value is produced, representing the sum of all values at all coordinates in the relational tensor product.

28. An apparatus for performing a query having a criterion in a relational database system, comprising:
a computer having a memory and a data storage device coupled thereto, wherein the data storage device stores a relational database, the relational database comprising one or more relations, each relation comprising one or more tuples on one or more attributes,
the relational database including a multi-order relational tensor, wherein orders of said multi-order relational tensor correspond to individual attributes, and coordinates along an order of said multi-order relational tensor correspond to values of the corresponding attribute, and numeric values at coordinate locations within said multi-order relational tensor represent a count of tuples in said relation having the attribute values that correspond to the coordinates of the numeric value along the orders of the multi-order relational tensor,
a processor processing said multi-order relational tensor to generate a statistic relating to said criterion in said query, and performing the query in the memory of a computer system by determining, from among two candidate approaches, an approach to use in processing said query based on said statistic.

29. The apparatus of claim 28 wherein said statistic for the query is generated by summing numeric values at coordinate locations matching a criterion in said query.

30. The apparatus of claim 28 wherein said query requests deletion of tuples meeting said criterion from said relation, and performing the query comprises, based on the statistic, either (a.) deleting a tuple from the relation based upon whether the criterion is met by the tuple, or (b.) transferring a tuple to a replacement relation based upon whether the criterion is met by the tuple.

31. The apparatus of claim 28 wherein said query requests insertion of tuples in said relation that meet said criterion, into a second relation, and performing the query comprises, based on the statistic, either (a.) scanning said relation for tuples meeting the criterion and adding those tuples to the second relation, or (b.) replicating said relation and deleting from the replica tuples not meeting the criterion, and then merging the replica with the second relation.

32. The apparatus of claim 28 wherein said query requests updating of tuples in said relation that meet said criterion, and performing the query comprises, based on the statistic, either (a.) rebuilding the relation by transferring tuples not meeting the criterion to a new version of the relation, and then updating the remainder, or (b.) directly updating the tuples in the relation that meet the criterion.

33. The apparatus of claim 28 wherein said query requests a join operation operating on attributes of two relations, said first and second relations being represented as first and second multi-order relational tensors, and generating said statistic comprises
forming first order intermediate relational tensors from said first and second relational tensors, and accumulating the products of the numeric values in corresponding coordinates in the intermediate relational tensors.

34. The apparatus of claim 28 wherein said query specifies multiple join operations, and further comprising generating statistics for said multiple join operations, wherein
performing the query comprises, based on the statistics for said multiple join operations, determining an order in which said join operations are performed, and performing the join operations in the determined order.

35. The apparatus of claim 28 wherein said query comprises a restriction query having a criterion.

36. The apparatus of claim 35 wherein said query comprises a query having operations selected from the group of SQL operations including DISTINCT, PROJECTION, EQUALS, LESS THAN, LESS THAN OR EQUAL, GREATER THAN, GREATER THAN OR EQUAL and LIKE.

37. The apparatus of claim 35 wherein generating said statistic comprises
forming a relational selection tensor representing the criterion of the restriction query, and
forming a relational tensor product of said relational selection tensor and said multi-order relational tensor storing said relation, and
converting said relational tensor product to a scalar value.

38. The apparatus of claim 37 wherein forming a relational selection tensor comprises building said relational selection tensor from a plurality of criteria derived from the criterion of said restriction query.

39. The apparatus of claim 38 wherein building said relational selection tensor comprises
forming intermediate relational selection tensors representing each of said plurality of criteria, and
forming a relational tensor product of the intermediate relational selection tensors to form said relational selection tensor representing the plurality of criteria derived from the criterion of the restriction query.

40. The apparatus of claim 37 wherein said relational selection tensor is a relational tensor having orders that are compatible with orders in said multi-order relational tensor storing said relation, and holding only numeric values of one or zero.

41. The apparatus of claim 40 wherein said relational selection tensor holds a numeric value of one in those coordinates corresponding to tuple values meeting the criterion in the query, and holds a numeric value of zero in those coordinates corresponding to tuple values not meeting the criterion in the query.

42. The apparatus of claim 37 wherein the relational tensor product of two relational tensors, tensor, is formed by multiplying numeric values in corresponding coordinates of the relational tensors to produce numeric values for that coordinate in a resulting relational tensor.

43. The apparatus of claim 42 wherein the relational tensors operated upon by the relational tensor product do not have complete correspondence in the domain of coordinates of the relational tensors along each of their orders, and wherein forming the relational tensor product further comprises accommodating relational tensors with mismatched domains.

44. The apparatus of claim 37 wherein orders of said relational selection tensor are expanded to match those of said multi-order relational tensor, by adding a needed order to the relational selection tensor and associating each coordinate value in the added order with a replica of the existing orders of the relational selection tensor.

45. The apparatus of claim 44 wherein the domains of coordinates along the orders of said relational selection tensor are matched with the domains of coordinates along the orders of said multi-order relational tensor, by identifying any coordinates in an order of the relational selection tensor not found in the corresponding order of the multi-order relational tensor, and adding any such coordinates to the order of the second relational tensor.

46. The apparatus of claim 45 wherein zero values are placed in all locations of said relational selection tensor corresponding to added coordinates.

47. The apparatus of claim 37 wherein the domains of coordinates along the orders of said multi-order relational tensor are matched with the domains of coordinates along the orders of said relational selection tensor, by identifying any coordinates on an order of the multi-order relational tensor not found in the corresponding order of the relational selection tensor, and adding any such coordinates to the order of the relational selection tensor.

48. The apparatus of claim 37 performing a restrict operation requesting return of only unique values in one or more particular attribute of tuples matching a query, said processor normalizing a result of said relational tensor product, by replacing all non-zero values in all locations in said result with a value of one.

49. The apparatus of claim 28 wherein said query includes an SQL SELECT DISTINCT operation.

50. The apparatus of claim 28 wherein said query includes an SQL SELECT LIKE operation.

51. The apparatus of claim 37 performing a restrict operation requesting return of only one or more attributes of tuples matching a query, said processor contracting a result of said relational tensor product along all orders than those corresponding to the attributes to be returned.

52. The apparatus of claim 51 wherein said query includes an SQL PROJECTION operation.

53. The apparatus of claim 37 wherein converting said relational tensor product to a scalar value comprises contracting said relational tensor product along an eliminated order, by producing a result relational tensor not having the eliminated order, and storing values in the result relational tensor that are equal to the sum of the values lying along the eliminated order at the same coordinates.

54. The apparatus of claim 53 wherein converting said relational tensor product to a scalar value comprises contracting said relational tensor product along each of its orders until, after the last contraction, a single scalar value is produced, representing the sum of all values at all coordinates in the relational tensor product.

55. A program product comprising:

a relational database comprising one or more relations, each relation comprising one or more tuples on one or more attributes, the relational database comprising a multi-order relational tensor, wherein orders of said multi-order relational tensor correspond to individual attributes, and coordinates along an order of said multi-order relational tensor correspond to values of the corresponding attribute, and numeric values at coordinate locations within said multi-order relational tensor represent a count of tuples in a relation having the attribute values that correspond to the coordinates of the numeric value along the orders of the multi-order relational tensor, a relational database system adapted to process said multi-order relational tensor to generate a statistic relating to a criterion in a query, and performing the query in the memory of a computer system by determining, from among two candidate approaches, an approach to use in processing said query based on said statistic, and signal bearing media bearing the multi-order relational tensor and the relational database system.

56. The program product of claim 55 wherein the signal bearing media comprises transmission media.

57. The program product of claim 55 wherein the signal bearing media comprises recordable media.

\* \* \* \* \*